(12) United States Patent
Kalns et al.

(10) Patent No.: US 9,875,494 B2
(45) Date of Patent: Jan. 23, 2018

(54) USING INTENTS TO ANALYZE AND PERSONALIZE A USER'S DIALOG EXPERIENCE WITH A VIRTUAL PERSONAL ASSISTANT

(71) Applicant: SRI International, Menlo Park, CA (US)

(72) Inventors: Edgar T. Kalns, San Jose, CA (US); William S. Mark, San Mateo, CA (US); Necip Fazil Ayan, Palo Alto, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 622 days.

(21) Appl. No.: 13/954,613

(22) Filed: Jul. 30, 2013

(65) Prior Publication Data
US 2014/0310001 A1    Oct. 16, 2014

Related U.S. Application Data

(60) Provisional application No. 61/812,698, filed on Apr. 16, 2013.

(51) Int. Cl.
| | | |
|---|---|---|
| *G10L 15/18* | (2013.01) | |
| *G10L 15/22* | (2006.01) | |
| *G06F 17/27* | (2006.01) | |
| *G06Q 30/06* | (2012.01) | |

(52) U.S. Cl.
CPC .......... *G06Q 30/06* (2013.01); *G10L 15/1822* (2013.01)

(58) Field of Classification Search
CPC ... G10L 15/22; G10L 15/18; G06F 17/30389; G06F 17/30867; G06F 17/27
USPC ........ 704/257, 270; 707/732, 751, 759, 768, 707/721
See application file for complete search history.

(56) References Cited

U.S. PATENT DOCUMENTS

| | | | | |
|---|---|---|---|---|
| 6,278,996 B1 * | 8/2001 | Richardson | ........... | G06F 17/273 |
| 6,473,738 B1 * | 10/2002 | Garrett | ................... | G06Q 30/02 |
| | | | | 705/26.8 |
| 6,810,111 B1 * | 10/2004 | Hunter | ................ | G06F 11/3466 |
| | | | | 379/1.02 |

(Continued)

FOREIGN PATENT DOCUMENTS

WO    WO2011/028844    3/2011

OTHER PUBLICATIONS

US 9,299,346, 03/2016, Hart (withdrawn)*

(Continued)

*Primary Examiner* — Martin Lerner
(74) *Attorney, Agent, or Firm* — Hickman Palermo Becker Bingham LLP

(57) ABSTRACT

A virtual personal assistant (VPA) application analyzes intents to, among other things, enhance or personalize a user's dialog experience with the VPA application. A set of intents, or multiple sets of intents, are maintained over the course of one or more user-specific dialog sessions with the VPA. Inferences may be derived from the set or sets of intents and incorporated into a current or future dialog session between the VPA and a user of the VPA application. In some embodiments, the inferences are only made available through the systemic understanding of natural language discourse by the VPA.

33 Claims, 10 Drawing Sheets

(56) References Cited

U.S. PATENT DOCUMENTS

| | | | | |
|---|---|---|---|---|
| 7,860,852 | B2* | 12/2010 | Brunner | G06F 17/30864 707/706 |
| 9,213,558 | B2* | 12/2015 | Tur | G06F 9/4446 |
| 9,501,743 | B2* | 11/2016 | Tur | G06F 9/4446 |
| 2008/0289029 | A1* | 11/2008 | Kim | G06F 17/30905 709/228 |
| 2009/0089044 | A1* | 4/2009 | Cooper | G06F 17/275 704/9 |
| 2010/0217604 | A1* | 8/2010 | Baldwin | G10L 17/22 704/275 |
| 2011/0282750 | A1* | 11/2011 | Rosen | G06F 17/3087 705/14.66 |
| 2012/0022857 | A1* | 1/2012 | Baldwin | G10L 15/22 704/9 |
| 2012/0030210 | A1* | 2/2012 | Sankhla | G06F 17/30699 707/741 |
| 2012/0296743 | A1* | 11/2012 | Velipasaoglu | G06F 17/30867 707/767 |
| 2013/0046638 | A1* | 2/2013 | Shepherd | G06Q 30/0251 705/14.67 |
| 2013/0061091 | A1* | 3/2013 | Moore | G06F 11/1443 714/18 |
| 2013/0091441 | A1* | 4/2013 | Pattan | G06Q 50/01 715/753 |
| 2013/0158980 | A1* | 6/2013 | Landry | G10L 15/22 704/9 |
| 2014/0172899 | A1* | 6/2014 | Hakkani-Tur | G06F 17/30522 707/759 |
| 2014/0222433 | A1* | 8/2014 | Govrin | G06F 17/20 704/260 |
| 2015/0149177 | A1* | 5/2015 | Kalns | G10L 15/1822 704/257 |
| 2015/0149182 | A1* | 5/2015 | Kalns | G10L 15/18 704/275 |
| 2017/0061316 | A1* | 3/2017 | Tur | G06F 9/4446 |

OTHER PUBLICATIONS

Deutsch, Alin, et al., "Querying XML Data", 1999, IEEE Computer Sociery Technical Committee on Data Engineering, pp: 1-9.
Scheffer, Nicholas, et al., U.S. Appl. No. 13/333,020, "Method and Apparatus for Generating Speaker-Specific Spoken Passwords", Dec. 21, 2011.
Scheffer, Nicholas, et al., U.S. Appl. No. 13/560,254, "Multi-Sample Conversational Voice Verification", Jul. 27, 2012.
Fitchard, Kevin, Spain's Siri-Challenger Sherpa Learns English, Arrives in the U.S., 2013, http://gigaom.com/2013/04/17/spains-siri-challenger-sherpa-learns-english-arrives-in-the-u-s/.
Nitz, et al., U.S. Appl. No. 13/966,665, filed Aug. 14, 2013, entitled "Providing Virtual Personal Assistance With Multiple VPA Applications.".
Kalns, et al., U.S. Appl. No. 13/891,858, filed May 10, 2013, entitled, "Rapid Development of Virtual Personal Assistant Applications.".
Ayan, et al., U.S. Appl. No. 13/866,509, filed Apr. 19, 2013, entitled "Clarifying Natural Language Input Using Targeted Clarification Questions.".
Wolverton, et al., U.S. Appl. No. 13/678,209, filed Nov. 15, 2012, entitled "Vehicle Personal Assistant.".
Nitz, et al., U.S. Appl. No. 13/585,003, filed Aug. 14, 2012, entitled "Method, System, and Device for Inferring a Mobile User's Context and Proactively Providing Assistance.".
Yadgar, et al., U.S. Appl. No. 13/314,965, filed Dec. 18, 2011, entitled "Generic Virtual Personal Assistant.".
Wolverton, et al., U.S. Appl. No. 13/678,213, filed Nov. 15, 2012, entitled "Vehicle Personal Assistant.".
Kalns, et al., U.S. Appl. No. 13/891,864, filed May 10, 2013, entitled, "Rapid Development of Virtual Personal Assistant Applications.".
Nitz, et al., U.S. Appl. No. 13/585,008, filed Aug. 14, 2012, entitled "Method, System, and Device for Inferring a Mobile User's Context and Proactively Providing Assistance.".

* cited by examiner

USING INTENTS TO ANALYZE AND PERSONALIZE A USER'S DIALOG EXPERIENCE WITH A VIRTUAL PERSONAL ASSISTANT

CROSS-REFERENCE TO RELATED APPLICATIONS

This application claims the benefit of and priority to U.S. Provisional Patent Application Ser. No. 61/812,698, filed Apr. 16, 2013, which is incorporated by reference herein in its entirety.

BACKGROUND

Computerized systems commonly known as virtual personal assistants ("VPAs") can interact with computing device users in a conversational manner to provide access to electronic information and services. To do this, the VPA needs to be able to correctly interpret conversational user input, execute a task on the user's behalf, determine an appropriate response to the input, and present system output in a way that the user can readily understand and appreciate as being responsive to the input. A complex assortment of software components work together to accomplish these functions.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
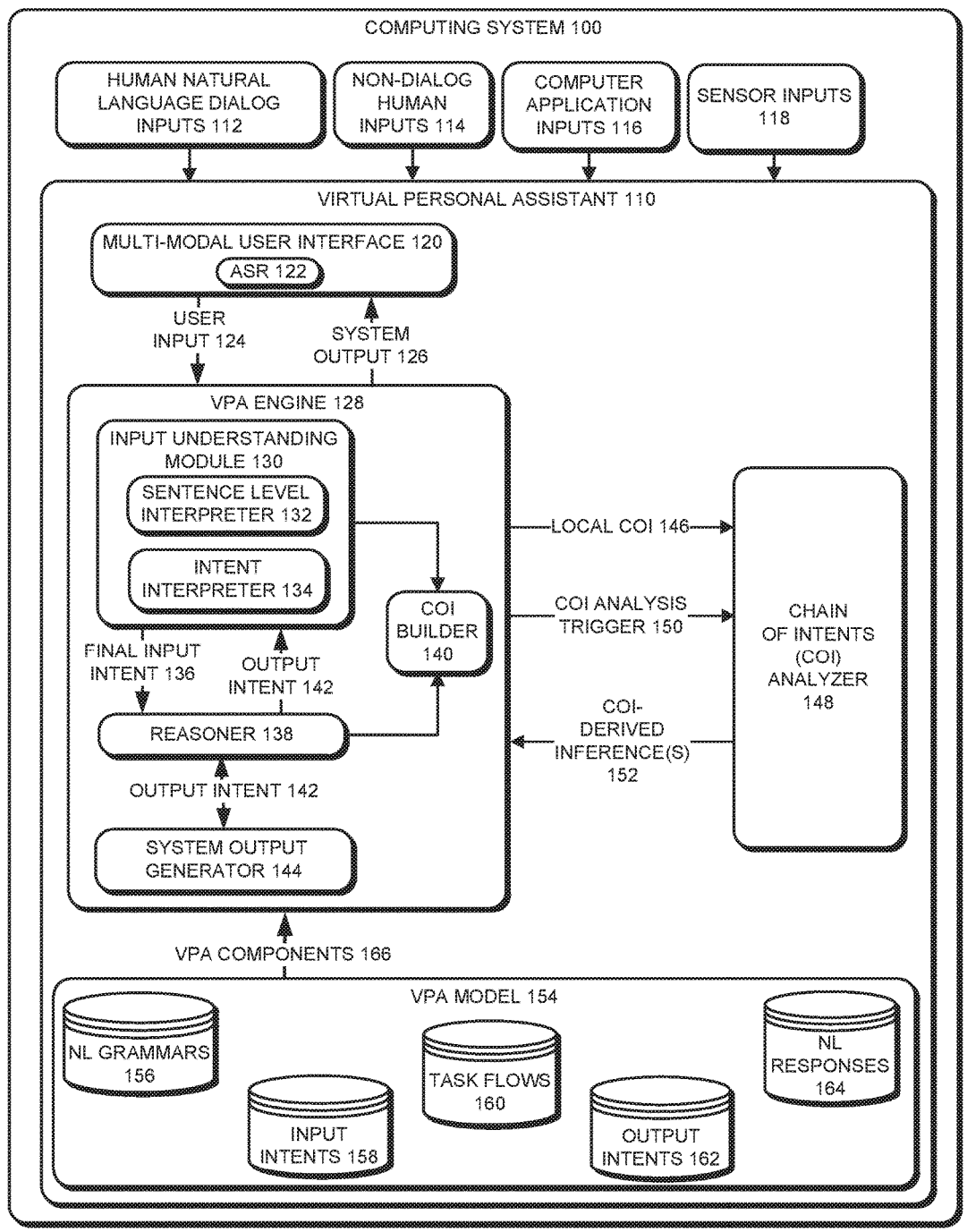
FIG. 1 is a simplified module diagram of at least one embodiment of a virtual personal assistant ("VPA") embodied in a computing system as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

The acceptance and continued use of virtual personal assistant (VPA) applications is likely to increase, especially if the assistance provided by the VPA can be tailored to the needs and preferences of particular users in appropriate and socially acceptable ways. For example, proactive assistance (e.g., system-initiated questions or suggestions) may be perceived as annoying by some users but welcomed by others, depending on the user's preferences, the context, or the circumstances surrounding the interaction. Some existing systems that attempt to provide a VPA-like experience repetitively ask the user the same generic questions (such as, "would you like me to search for _?") when those systems are unable to interpret the user's dialog input. The cost of annoyance is high, as annoyed users are more likely to stop using the VPA.

Often, personalization in consumer applications today is done by way of user settings, where users explicitly state their preferences in a fill-in form. As disclosed herein, in some embodiments, the VPA 110 can collect preferences and meta-goals of the user that are explicitly or implicitly communicated by the user during the user's dialog with the VPA 110, but in a natural, conversational way. As a result, the VPA 110 can obtain user-specific preferences, habits, and the like without requiring any extra effort on the part of the user to establish those preferences.

As disclosed in the aforementioned U.S. Provisional Patent Application Ser. No. 61/812,698, the user's individual "dialog history;" that is, the historical record of natural language dialog provided by the user and received by a VPA application, can be analyzed to learn about the user's past interactions with the VPA. As used herein, "natural language" may refer to words, phrases, verbal expressions, and/or combinations thereof, which are formulated by a human, device, or system in a fashion that is or is intended to approximate or simulate speech that normally arises in an unpremeditated fashion as the result of the innate facility for language possessed by the human intellect (as distinguished from, for example, structured computer programming languages or code). As used herein, terms such as "dialog" and "conversation" generally refer to the use of natural language (e.g., spoken or written) in the context of a communicative exchange of information, ideas, opinions, sentiments, observations, questions and answers, statements and responses, or the like, involving a user and a computing device.

Alternatively or in addition to evaluating the history of the "raw" natural language dialog supplied by the user, as disclosed herein, embodiments of a VPA application 110 can capture and analyze a set of intents in order to deduce higher-level or implicit (e.g., unstated) information about the user and/or the dialog session involving the user and the VPA 110. As used herein, an "intent" generally refers to a structured representation of the VPA's interpretation of the system-determined likely intended meaning of the user's natural language dialog input. For example, an intent may include semantically meaningful information about the user's natural language dialog input, which the VPA 110 can understand and process in order to invoke an appropriate electronic service on the user's behalf, or to execute some other action to provide assistance to the user in response to the dialog input. Stated another way, an intent may represent a likely intended goal or objective of the user in using the VPA 110, which is instantiated by the VPA 110 based on the VPA's interpretation of the user's natural language dialog input.

Terms such as "goal" and "objective" are used herein to convey that the VPA 110 attempts to determine not only what the words of the user's conversational input mean, but the user's actual intended goal or objective, which he or she used those words to express. To do this, the VPA 110 often needs to consider the dialog context and/or other aspects of the user's current context (e.g., intent context). As an example, the user might say something like "I need ten" or "get me that one," which really means that the user's goal is to withdraw ten dollars from the bank, or to buy a certain product, where the product may have been identified by the user earlier in the dialog or identified by the system through other multi-modal inputs (such as a tap selecting an on-screen graphic). Determining the intended goal or objective of a user's natural language dialog can involve the application of artificial-intelligence based methods and systems.

It should be appreciated that intents may be predefined for a particular domain and may vary significantly from one domain to another. Accordingly, the VPA 110 may predefine or utilize a finite number of intents in relation to any given domain. For example, an e-commerce VPA 110 may include predefined input intents such as "search product," "get product details," and "confirm purchase," whereas a health-information VPA 110 may include predefined input intents such as "search symptoms," "get adverse effects," and "contact physician," and a financial services VPA 110 may include predefined input intents such as "transfer funds," "check balance," and the like.

Embodiments of the VPA 110 may instantiate a predefined intent in response to an instance of user-supplied dialog input (e.g., a natural language utterance). That is, the VPA 110 may, for example, ascribe values to one or more parameters of a predefined intent based on a particular instance of the user-supplied dialog input. Thus, each dialog session involving a user and the VPA 110 may result in the instantiation of various predefined intents. For ease of discussion, such instantiation may be referred to herein simply as creating a set of intents and each instantiated intent may simply be referred to as an "intent." As indicated above, however, it should be appreciated that the intents that may be instantiated are predefined structures, at least some of which may be specially defined or configured for a particular domain.

A set or sets of intents instantiated by the VPA 110 during a dialog session with a user and/or over the course of several dialog sessions is likely to be unique to the user and to the dialog session or sequence of dialog sessions, because dialog with the VPA 110 is often or primarily user-directed rather than system-directed. That is, the VPA 110 is typically designed to try to understand whatever dialog input the user provides at any given time, rather than conducting a dialog according to a predefined script, or otherwise expecting the dialog to proceed in a structured way, or requiring that the user speak certain information at certain, specific times (as may be the case in an interactive voice response or IVR system, for example). As described in more detail below, information derived from the set of intents can be used to personalize or otherwise enhance the user's current and/or future dialog experiences with the VPA 110, and thereby increase the likelihood of frequent and continued use of the VPA 110.

The set of intents may include intents that are instantiated during a current dialog session involving the user and the VPA 110 as well as intents that have been instantiated during one or more previous conversations involving the user and the VPA 110. In various embodiments, a set of intents may be referred to as a "plurality of intents," a "dialog context," a "chain of intents," an "intent history," or by similar terminology, and may refer to a portion or combination of any of these. Any of these terms or similar terminology may be used interchangeably in some embodiments, while in other embodiments, a more specific meaning may be ascribed to certain terms.

In some embodiments, a set of intents may include one or more pairs or combinations of "input intents" 136 and "output intents" 142, where an input intent 136 represents the VPA-determined likely meaning of the corresponding user-supplied natural language dialog input 112, and an output intent 142 represents an action performed by the VPA 110 (e.g., output generated by the VPA 110) in response to an input intent 136. In other words, an output intent 142 may relate to the completion or "fulfillment" of a user's goal represented by the corresponding input intent 136. For instance, an output intent of "confirm transaction" may be instantiated in response to a "transfer funds" input intent once the required amount, source and destination information has been determined. Thus, in some embodiments, if an output intent 142 relating to an input intent 136 is present in a set of intents, the VPA 110 may deduce that the related input intent 136 has been completed by the VPA 110. In some cases, each output intent 142 may be related to only one input intent 136, but each input intent 136 may have many related output intents 142.

It should be appreciated that, as discussed above, in the illustrative embodiments, an input intent 136 refers to an instance of a defined input intent 158; that is, an input intent 136 represents a system-determined interpretation of dialog input (e.g., an utterance) made by a user in a dialog session with the VPA 110. Likewise, in some embodiments, an output intent 142 refers to an instance of a defined output intent 162, where the instance 142 corresponds to an input intent 136.

As such, a single communicative exchange X of a natural language dialog interaction between the user and the VPA 110 may be represented by a combination of an instance of an input intent, $ii_x$ and one or more instances of output intents, $oi_x$; that is, the communicative exchange $X=[ii_x, oi_{x1} \ldots oi_{xj}]$, where j represents the number of instantiated output intents that are generated for the instance of the input intent $ii_x$. The set of instantiated intents C resulting from one entire dialog session between the user and the VPA 110, where the dialog session involves n communicative exchanges X, may thus be represented as $C=\{[ii_1, oi_1 \ldots oi_{1a}], [ii_2, oi_{21} \ldots oi_{2b}], \ldots, [ii_n, oi_{n1} \ldots oi_{n2}]\}$, where a, b, and z represent the number of instantiated output intents associated with each of the instantiated input intents $ii_1$, $ii_2$, $ii_n$, respectively. Further, the set of instantiated intents D resulting from a number of dialog sessions m between the user and the VPA 110 may be represented as $D=\{C_1 \ldots C_m\}$. As should be understood, x, n, j, a, b, z, and m refer to positive integers in the foregoing examples.

Intuitively, at least the input intents 136 are typically temporally spaced (e.g., occur sequentially or at different times), as each refers to a different instance of user-supplied natural language dialog input (e.g., an "utterance"), and similarly, at least the output intents 142 corresponding to different input intents 136 are also temporally spaced. As such, the input intents 136 and output intents 142 in a set of intents normally can be uniquely distinguished from one another at least by their date/time stamps. However, it is theoretically possible that a user may supply two different instances of natural language dialog input 112 to the VPA 110 at roughly the same time (e.g., spoken voice input and text), in which case the VPA 110 may distinguish the input intents 136 corresponding to the two inputs 112 by assigning a different date/time stamp to each, or by uniquely tagging them in some other way (using, e.g., a combination of a date/time stamp and an input type of text or voice), so that they each are reflected as different intents in the set of intents. Likewise, it is possible that the VPA 110 may generate multiple different output intents 142 concurrently, in which case the VPA 110 establishes a unique identifier for each output intent 142 in a similar or otherwise suitable way.

In some embodiments, a status may be associated with each of the instantiated input intents in a set of intents. Indicators of intent status may include, for example, "non-final,' "final," "incomplete," "complete," "transient," "ephemeral," and/or others. A "final" input intent may refer to an input intent that represents the VPA 110's (e.g., the input understanding module 130's) best interpretation of an instance of the user's dialog input in view of the dialog context, which is ready for further processing by the VPA 110 (e.g., the reasoner 138). A "non-final" input intent may refer to an input intent that is not yet ready for further processing by the VPA; e.g., if the VPA 110 is not yet able to arrive at a satisfactory interpretation of the user's dialog input. An "incomplete" intent may refer to a final input intent that the VPA 110 has not finished processing (e.g., by executing a task flow 160). A "complete" intent may refer to a final input intent that the VPA 110 has finished processing. In some embodiments, "processing" refers to "reasoning" performed by the reasoner 138. Such reasoning may be performed using, for example, artificial intelligence-based methods, to apply the system-captured and system-maintained specific knowledge of a user's natural language dialog request (e.g., the input intent, its arguments, and its current status—what parts of the intent are already filled), together with back-end logic, and infer the most likely best next thing for the system to do (e.g., a system operation that the user would like the VPA 110 to perform next).

Some final intents may represent only a partial interpretation of the user's dialog input yet have a status of complete if the VPA 110 is able to process the intent. The terms "transient" or "ephemeral" may refer to input intents that are final (e.g., interpreted in view of the dialog context and ready for processing) and complete (processed, e.g., according to a task flow 160), but which are not retained in persistent memory by the VPA 110 or by an electronic service invoked by the VPA 110. Such may be the case if the system's response to the intent does not result in the execution of any "back-end" electronic transactions, or for other reasons.

Transient intents can be very informative since they may contain user preferences that are stated by the user in dialog with the VPA 110 but have no "back-end" record. To illustrate the potential of this, suppose the VPA 110 is implemented as a banking assistant. The VPA 110 can recognize a "transfer funds" input intent and execute system operations to complete the intent, resulting in a back-end "footprint." However, if, during his or her "transfer funds" dialog with the VPA 110, the user says, "gee, I wish you were faster" or "I really like this new personal assistant," the content of these statements can be preserved by the VPA 110 using the methods and techniques disclosed herein. As a result, useful information (e.g., about the efficacy of the service the bank is providing) can be captured and perhaps acted upon by the VPA 110 (or a relevant service provider), without any extra effort required of the user (no need for surveys, polls, questionnaires, etc.). For example, even casual comments that may be offered by the user in a natural, conversational fashion can be captured by the VPA 110 and used to improve the current dialog session and/or future dialog sessions with the user, or to enhance the VPA's appeal to a wider audience.

In some embodiments, a set of intents may include intents or sets of intents that are instantiated by the VPA 110 or by other VPAs during natural language dialog interactions and/or dialog sessions between the VPA 110 or other VPAs and other users. For example, in some embodiments, the set of intents may include intents that are instantiated by other executing instances of the VPA 110 during dialog sessions with users who have previously been identified to the VPA 110 as family, friends, or others having a "connection" or relationship to the user (e.g., people who are connected with the user via a social media platform such as FACEBOOK, LINKEDIN, and/or others). In some embodiments, the set of intents may include intents that are instantiated by other instances of the VPA 110 during dialog sessions with users who do not have a relationship or connection with the user, other than the fact that they have also used the same VPA application and/or other VPA applications. In this way, some embodiments of the VPA 110 can tailor the user's dialog experience with the VPA 110 based on information that the VPA 110 learns from its or other VPAs' dialog interactions with other users, including users that are likely to have similar goals, objectives, preferences, opinions, and/or characteristics, alternatively or in addition to tailoring the user experience according to the VPA 110's own analysis of the user's personal set of intents.

Some embodiments of the VPA 110 analyze the set(s) of intents "behind the scenes," e.g., autonomously, offline or in the background, while other embodiments analyze intents in "real time" during a current conversation, and still other embodiments perform both "offline" and "real-time" intent analysis. The various forms of intent analysis described herein provide information to the VPA 110 to, for example, reduce or eliminate the need for the VPA 110 to ask the user many clarifying questions, and thus allow the VPA 110 to avoid conducting a lengthy dialog with which the user may lose interest. In these and other ways, the VPA 110 may, among other things, enhance the user's dialog experience with the VPA 110 while minimizing or eliminating the "annoyance factor" that is sometimes associated with existing products that attempt to provide a VPA-like experience.

Referring now to FIG. 1, a simplified module-level depiction of the illustrative VPA 110 is shown. The VPA 110 includes, among other computer-executable components, a multi-modal user interface 120, a VPA engine 128, a chain of intents (COI) analyzer 148, and a VPA model 154. The VPA 110 and its various components are embodied as computer software, firmware, and/or hardware in a computing system 100. The computing system 100 may include one or multiple computing devices as described more fully below with reference to FIG. 10.

Figure 3:
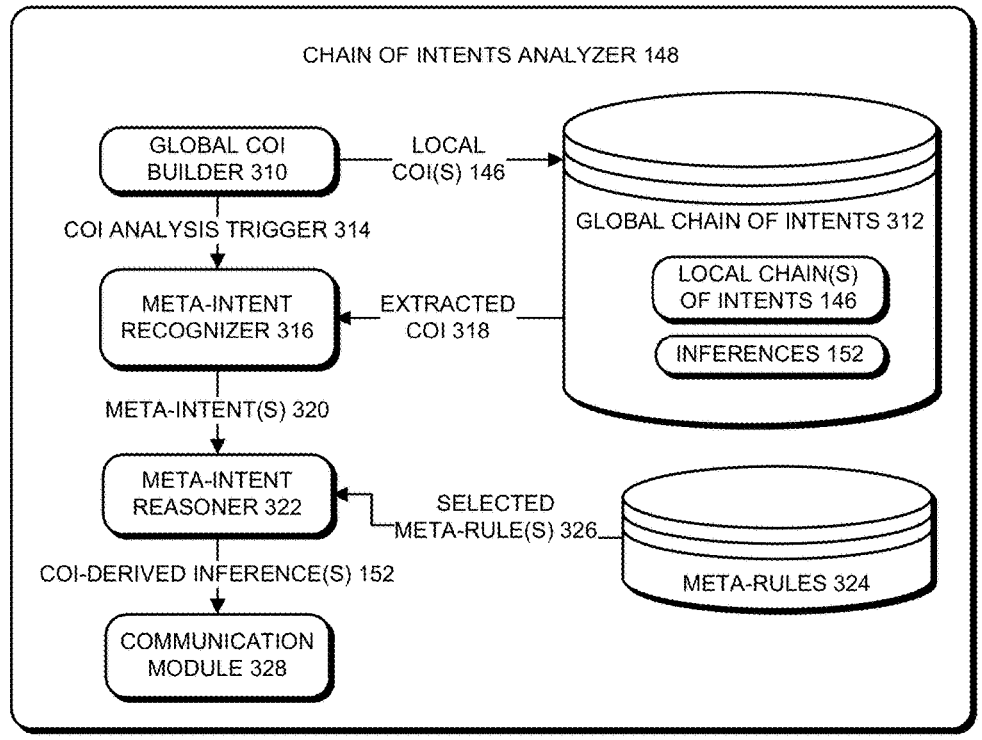
FIG. 3 is a simplified module diagram of at least one embodiment of the chain of intents analyzer of FIG. 1.

The illustrative COI analyzer 148 analyzes a set of intents referred to herein as a "global chain of intents" 312 (FIG. 3). The global chain of intents 312 may include one or more local chain(s) of intents 146 that are maintained over the course of one or more previous dialog sessions involving the user and/or other users. For example, whereas each local chain of intents 146 may retain a set of intents C that includes intent information for each of the n interactions in a single dialog session between the user and the VPA 110, the global chain of intents 312 may retain a set of intents D that includes a number of sets of intents C, each of which corresponds to a different dialog session previously engaged in by the user and the VPA 110. In some embodiments, the set of intents D may include other sets of intents C created by other instances of the VPA 110 interacting with other users. In response to one or more COI analysis triggers 150, which may be issued by the VPA engine 128 or some other source (e.g., an external computer application) from time to time, or at other times, the COI analyzer 148 supplies one or more COI-derived inferences 152 to the VPA engine 128 or one or more of its components. As disclosed herein, the inferences may be uniquely available through the systemic understanding of natural language discourse by the VPA, in some embodiments.

Figure 2:
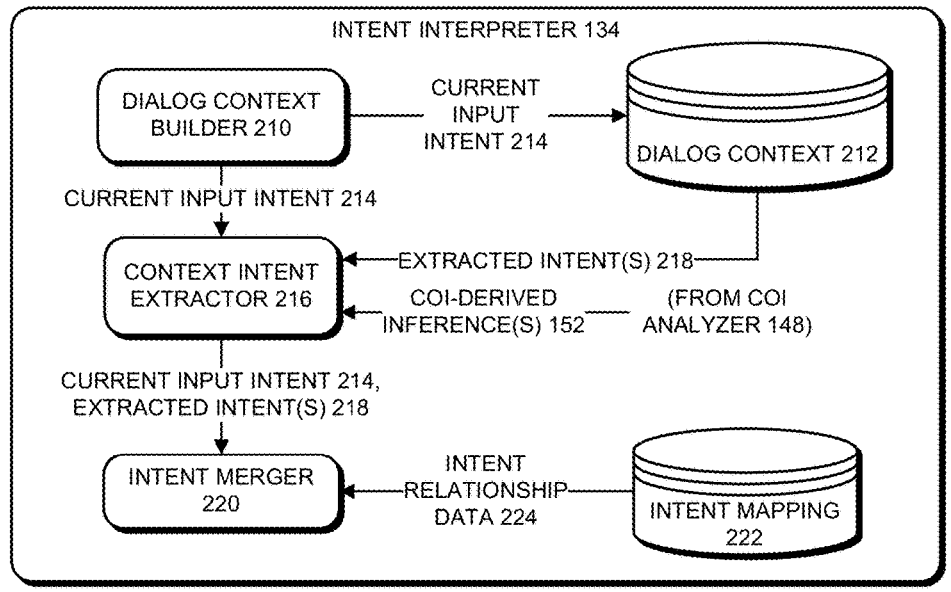
FIG. 2 is a simplified module diagram of at least one embodiment of the intent interpreter of FIG. 1.

The illustrative VPA engine 128 includes, among other machine-executable (e.g., computer-executable) components, an intent interpreter 134 and a COI builder 140. As described in more detail below, the illustrative intent interpreter 134 analyzes a set of intents referred to herein as a "dialog context" 212 (FIG. 2). The dialog context 212 is maintained by the VPA 110 during at least a portion of a current dialog session in order to interpret a current input intent (e.g., in "real time"). For example, the dialog context 212 retains the intent information for each of the interaction instances X that make up a current dialog session. The dialog context 212 may include other information about the user's current context, including context information contained in or derived from other types of inputs 114, 116, 118. The COI builder 140 creates the sets of intents $C_1 \ldots C_n$ that correspond to the dialog sessions conducted by the VPA 110 with the user and which may be analyzed by the COI analyzer 148.

The VPA 110 can receive (e.g., via the multi-modal user interface 120) and utilize a number of different forms of input, including human natural language dialog inputs 112 (e.g., spoken or textual words and phrases), non-dialog human-generated inputs (e.g., non-dialog keyboard, keypad, or touch screen inputs, mouse clicks, gestures, and/or others), computer application inputs 116 (e.g., data and/or instructions passed by another computer application to the VPA 110, through an application programming interface, for example), and sensor inputs 118 (e.g., electrical signals embodying sensed information such as geographic location, motion, temperature, activity, biometric data, etc.).

In some embodiments, the multi-modal user interface 120 may perform authentication processes to verify a user's identity. For example, the user's identity may be verified using voice biometrics as disclosed in, for example, Scheffer et al., U.S. patent application Ser. No. 13/560,254, filed Jul. 27, 2012, now U.S. Pat. No. 9,251,792, and entitled "Multi-Sample Conversational Voice Verification;" and Scheffer, U.S. patent application Ser. No. 13/333,020, filed Dec. 21, 2011, now U.S. Pat. No. 9,147,400, and entitled "Method and Apparatus for Generating Speaker-Specific Spoken Passwords," both of which are incorporate herein by this reference in their entirety.

In some embodiments, the multi-modal user interface 120 captures the user's spoken natural language dialog input with a microphone or other audio input device of the computing system 100. Alternatively or in addition, the multi-modal user interface 120 captures text-based natural language dialog input by, for example, a touch pad, key pad, or touch screen of the computing system 100. Other (e.g., non-NL dialog) user inputs also may be captured by a touch pad, keypad, touch screen, or other input device, through the user interface 120. Such inputs may include, for example, mouse clicks, taps, swipes, pinches, and/or others. In some cases, the interface 120 may capture "off-device" body movements or other gesture-type inputs (such as hand waves, head nods, eye movements, etc.) by, e.g., a camera, motion sensor and/or kinetic sensor, which may be integrated with or otherwise in communication with the computing system 100. In any event, the captured user inputs are at least temporarily stored in memory of the computing system 100. While the VPA 110 is often mainly concerned with processing the NL dialog inputs, any or all of the other forms of user inputs (e.g., the inputs 114, 116, 118) may be used by the VPA 110 to aid in its understanding of the NL dialog inputs, to determine the intent of the NL dialog inputs, to determine a suitable response to the NL dialog inputs, or for other reasons.

Machine-executable components of the multi-modal user interface 120 process the respective inputs 112, 114, 116, 118 and provide machine-readable representations of such inputs to the VPA engine 128 (such representations referred to in FIG. 1 as "user input" 124). For example, components of the multi-modal user interface 120 may convert analog signals to digital form, translate mouse clicks or gestures to a text command or data, or resolve data and/or instructions received from other computer applications according to conversion specifications using, for example existing or readily available techniques.

In the case of spoken natural language inputs, an automated speech recognition (ASR) module 122 processes the natural language audio and generates a machine-readable version of the user's speech that can be further analyzed by the input understanding module 130. Typically, an ASR system identifies spoken words and/or phrases in verbal natural language dialog inputs and recognizes and converts them into text form (e.g., words, word strings, phrases, "segments," "chunks," "sentences," or other forms of verbal expression). There are many ASR systems commercially available; one example is the DYNASPEAK system, available from SRI International. While the ASR system 122 is shown in FIG. 1 as a component of the multi-modal user interface 120, in other embodiments, the ASR system 122 may be an external (e.g. third party) component with which the VPA 110 communicates. In other embodiments, the ASR system 122 may be incorporated into the VPA engine 128 (e.g., as a component of the input understanding module 130).

In some embodiments, the non-dialog human inputs 114, computer application inputs 116, and/or sensor inputs 118 may be used by the VPA engine 128 to supply contextual information for the interpretation of the NL dialog inputs 112. Some examples of applications including multi-modal user interfaces and/or "context aware" systems are described in other patent applications of SRI International, for example, Tur et al., PCT International Application Publication No. WO 2011/028833, entitled "Method and Apparatus for Tailoring Output of an Intelligent Automated Assistant to a User;" Yadgar et al., U.S. patent application Ser. No. 13/314,965, filed Dec. 18, 2011, now U.S. Pat. No. 9,082, 402, entitled "Generic Virtual Personal Assistant;" Nitz et al., U.S. patent application Ser. No. 13/585,003, filed on Aug. 14, 2012, entitled "Method, System, and Device for Inferring a Mobile User's Context and Proactively Providing Assistance," Nitz et al., U.S. patent application Ser. No. 13/585,008, filed Aug. 14, 2012, now U.S. Pat. No. 9,015,099, entitled "Method, System, and Device for Inferring a Mobile User's Context and Proactively Providing Assistance;" and Wolverton et al., U.S. patent application Ser. No. 13/678,209, filed Nov. 15, 2012, entitled "Vehicle Personal Assistant" and Wolverton et al., U.S. patent application Ser. No. 13/678,213, filed Nov. 15, 2012, now U.S. Pat. No. 9,085,303, entitled "Vehicle Personal Assistant." However, this disclosure is not limited thereby, and any suitable multi-modal interface and/or context-aware system may be included in the VPA 110 and/or otherwise utilized by the VPA 110 in accordance with the requirements of a particular design.

The multi-modal user interface 120 is in bidirectional communication with the VPA engine 128 by one or more electronic communication links (e.g., a bus, a network connection, or other type of wired or wireless signal path or paths). In general, the VPA 110 and more specifically the VPA engine 128 include a number of computer-executable components that work together and communicate with each other and with various portions of the VPA model 154 from time to time as needed using suitable electronic communication links (such as any of those mentioned above) to conduct a conversational natural language dialog session with the user. For example, the VPA engine 128 is in bidirectional communication with the COI analyzer 148 and the VPA model 154. Likewise, the components of the VPA engine 128 are configured to engage in two-way electronic communication in a similar manner. For instance, an input understanding module 130 may communicate bidirectionally with a reasoner 138 to obtain data values that it needs to populate data fields of an input intent 136. Similarly, a system output generator 144 may communicate bidirectionally with the reasoner 138 to obtain data values that it needs for the presentation of system output 126.

Other embodiments of the VPA 110 may include additional components or modules, such as domain-specific VPA components. Further, some components described herein as being included in the VPA 110 or the VPA engine 128 may be located external to the VPA 110 or the VPA engine 128, as the case may be, in some embodiments, and thus communicate with the VPA 110 or the VPA engine 128, by a suitable communication link such as one of the types of communication links described herein. In addition to the aforementioned applications of SRI International, some examples of components of the VPA engine 128 and the VPA model 154 are described, for example, in Kalns et al., U.S. patent application Ser. No. 13/891,858, filed on May 10, 2013, entitled "Rapid Development of Virtual Personal Assistant Applications," and Kalns et al., U.S. patent application Ser. No. 13/891,864, filed May 10, 2013, now U.S. Pat. No. 9,489,625, entitled, "Rapid Development of Virtual Personal Assistant Applications," both of SRI International. However, this disclosure is not limited thereby, and any suitable components may be included in the VPA 110 and/or otherwise utilized by the VPA 110 in accordance with the requirements of a particular design.

The NL inputs 112 and other inputs 114, 116, 118 captured by the multi-modal user interface 120 are received and processed by the VPA engine 128. When the VPA engine 128 receives an instance of user input 124, the input understanding module 130 analyzes the input 124 and formulates therefrom a likely intended goal or objective of the user, which it passes to the reasoner 138 in the form of an input intent 136. The reasoner 138 analyzes the input intent 136 and executes any task flows 160 that are needed to prepare a response to the input intent 136. The reasoner 138 generates an output intent 142, which represents the VPA's response to the input intent 136 (e.g., a fulfillment of the user's likely intended goal or objective), and passes the output intent 142 to the system output generator 144.

In more detail, a sentence level interpreter 132 of the input understanding module 130 analyzes the words and/or phrases produced by the ASR system 122 and determines a meaning most likely intended by the user given, for example, other words or phrases presented by the user during the dialog. For instance, the sentence level interpreter 132 may apply a rule-based parser and/or a statistical parser to determine, based on the verbal context, the likely intended meaning of words or phrases that have multiple possible definitions (e.g., the word "pop" could mean that something has broken, may refer to a carbonated beverage, or may be the nickname of a person, depending on the context, including the surrounding words and/or phrases of the current dialog input, previous rounds of dialog, and/or other multi-modal inputs). A hybrid parser may arbitrate between the outputs of the rule-based parser and the statistical parser to determine which of the outputs has the better confidence value. An illustrative example of a natural language understanding component that may be used in connection with the input understanding module 130 is the SRI Language Modeling Toolkit, available from SRI International. In some embodiments, the sentence level interpreter 132 maps the NL dialog input 124 to a natural language grammar 156, which the sentence level interpreter 132 believes, e.g., based on its artificial intelligence based natural language processing, most closely corresponds to the NL dialog input 124, and then maps the selected NL grammar 156 to the input intent 136. In some embodiments, the input understanding module 130 combines the likely intended meaning, goal, and/or objective derived from the user's NL dialog input as analyzed by the sentence level interpreter 132 with any multi-modal inputs and communicates that information to the reasoner 138 in the form of the final input intent 136.

In some embodiments, the input intent 136 is defined as a computer programming structure that has a name (such as "buy product" or "search product category") and an associated parameter list, where each parameter has one or more associated attributes. In some implementations, the intent name may correspond to an activity that the user desires to have performed by the VPA and an object (e.g., person, place or thing) that is the subject of that activity. In some embodiments, the input understanding module 130 may select the input intent 136 to apply to a given instance of user dialog from a knowledge base of input intents 158. As an example, there are many ways in which a user may indicate that they want to buy a product. Some users may say, "I'm looking for a gift," while others may say, "I need a gift," still others may say, "I'd like to buy a gift," and still others may say, "Show me some popular gifts." Based on that NL user input 112 and/or other multi-modal inputs 114, 116, 118 (e.g., the user's gaze or the current time/date), the input understanding module 130 may determine that the likely intent of the user is to search for a product for another person. As such, the input understanding module 130 instantiates, based on the NL user input 112, an input intent of "SearchProduct (recipient=other)." In other words, the predefined "search product" input intent is selected from the input intents knowledge base 158 and the "recipient" parameter of the intent is populated with a data value indicating that the recipient is someone other than the user.

The input understanding module 130 of the VPA engine 128 also includes the intent interpreter 134. As described in more detail below with reference to FIG. 2, the intent interpreter 134 builds and maintains the dialog context 212, and uses the dialog context 212 to interpret current input intents 214, which are instances of input intents 158 that are generated by the sentence level interpreter 132 during a current dialog session involving the user and the VPA 110 (e.g., in "real time"). To interpret the current input intents 214, the intent interpreter 134 may search the dialog context 212 for an intent that has a specified status, parameter, or data value, find an intent in the dialog context 212 that matches the specified status, parameter, or data value, and incorporate the found intent into the current input intent 214. In this way, the intent interpreter 134 can increase the user's satisfaction with the current dialog by "remembering" information that the user has supplied earlier in the conversation and connecting the remembered information with the current input intent 214, even if the user's dialog has covered one or more different topics in the interim. Alternatively or in addition, the intent interpreter 134 may leverage the COI-derived inference(s) 152 that are produced by the COI analyzer 148 as described in more detail below with reference to FIG. 3. Thus, the intent interpreter 134 can help the VPA engine 128 understand, for example, the intended meaning of the user's natural language dialog input 112 when that input makes implicit reference to an earlier statement made in the same conversation or even when the input implicitly refers to dialog that occurred previously in a different conversation entirely. For example, the intent interpreter 134 can associate two pieces of dialog input 112 with each other despite the presence of intervening instances of dialog input 112.

The reasoner 138 generally synthesizes the final input intent 136 and/or any of the other available inputs in view of applicable dialog models, business logic, rules, etc., which may be supplied by one or more VPA components 166 of the VPA model 154. From this analysis, the reasoner 138 determines a likely appropriate task flow or "work flow" to execute on the user's behalf and/or a likely appropriate system response to the user's intended goal or objective as derived from the meaning of the user inputs 124 and reflected in the input intent 136 (where "likely appropriate" may refer to a computed statistical measure of confidence determined and/or evaluated by the reasoner 138). In some cases, the likely appropriate system task may be to perform a requested action on the computing system 100 (e.g., schedule a meeting on the user's electronic calendar, determine and output the location of the nearest gas station, display search results, etc.), whereas in other cases, an appropriate system task or response may be to present information to the user in order to elicit from the user additional inputs that may help the VPA engine 128 clarify the input intent 136. More generally, the reasoner 138 executes one or more task flows 160 to determine one or more output intents 142 that satisfy the input intent 136, and to determine the data values (if any) to pass to the system output generator 144 along with the output intent(s) 142. The reasoner 138 may also pass the output intents 142 back to the input understanding module 130 for processing by the intent interpreter 134 or for other reasons.

In some embodiments, the reasoner 138 also serves as a dialog manager, which keeps track of the current state and flow of each conversation or dialog that occurs between the user and the VPA 110. In such an embodiment, the reasoner 138 may apply dialog-managing rules, templates, or task flows, for example, to the user's NL dialog input 112, which are appropriate in view of the user's current context. For example, the reasoner 138 may apply rules for determining when a conversation has started or ended, or for determining whether a current input is related to other inputs, based on one or more of the current or recently-obtained multi-modal inputs 112, 114, 116, 118.

In various embodiments, the COI builder 140 may be an independent component of the VPA 110 or form a portion of another component of the VPA 110 (e.g., as a component of the VPA engine 128). As noted above, the COI builder 140 creates and/or maintains historical intent information generated over the course of one or more natural language dialog sessions between the VPA 110 and the user, and stores such information in the local chain(s) of intents 146 (where "local" is used to signify that the chain of intents created by the COI analyzer 148 is specific to the user and the current dialog session). The local chain(s) of intents 146 may be stored in, for example, a searchable database. The COI builder 140 generates and/or populates a data structure (e.g., a database, table, etc.) that is used to identify and retain in computer memory the input intents 136 and the corresponding output intents 142 that are instantiated during each dialog session between the VPA 110 and the user. In some embodiments, the COI builder 140 may access the dialog context 212, described below with reference to FIG. 2, in order to obtain intent information to build the local chains of intents 146.

In general, the chain of intents created by the COI builder 140 identifies the final input intent 136 and the output intent(s) 142 that relate to each communicative exchange of each dialog session involving the user and the VPA 110. In some embodiments, an intent 136 may represent only a partial interpretation of the user's NL dialog input 112 yet may be included in the chain of intents 146 created by the COI builder 140. In other embodiments, instantiated intents of any type or status, whether partial, final, complete or incomplete, transient, ephemeral, or otherwise, may be retained in the chain of intents 146.

As used herein, "communicative exchange" may refer to a user's NL input 112 and the subsequent system output 126 (e.g., the desired output formulated by the system output generator 144 in accordance with the output intent 142) of the VPA 110. For example, a communicative exchange may involve a user asking, "What is the temperature?" and the VPA 110 responding, "It is currently sixty-eight degrees Fahrenheit." Of course, in some instances, the VPA 110 may satisfy the input intent 136 by performing an action that does not involve the presentation of system output 126 to the user. In such instances, the system's response to the input 112 (e.g., "command executed") is reflected in an output intent 142 that can be added to the chain of intents and stored in the local chain(s) of intents 146.

In some embodiments, the reasoner 138 may determine that more than a single action should be performed in response to the input intent 136. For example, in an e-commerce domain, the input intent 136, "purchase product" may correspond to two output intents 142: "confirm transaction" and "ask to complete survey." Of course, in other embodiments, multiple actions may performed by a task flow 160 that results in a particular output intent 142. For ease of discussion, input intents 136 may be described as corresponding to a single output intent 142; however, this disclosure is not intended to be limited thereby.

The particular data structure of the local chain of intents 146 may vary depending on the requirements of a particular design or implementation of the VPA 110. In some embodiments, each chain of intents 146 may be represented as a set of input intent 136 and output intent 142 pairs (i.e., a set of "intent pairs") where each intent pair corresponds to a specific communicative exchange. In some embodiments, the chain of intents 146 may be represented as a set of n-tuples, where each n-tuple in the set identifies an input intent 136 and up to n−1 corresponding output intents 142 of a particular communicative exchange. For example, a sample chain of intents 146 may be represented as:

COI = {[Find_POI(charge), Show_POI], [Update_Calendar(lunch), Goal_Executed], [Get_Charging_Information(duration), Message(duration)], [Get Charging Information(acvitity_while_charging), Show_POIs]} where Find_POI is an input intent 136, "charge" is a parameter of the Find_POI input intent 136, Show_POI is an output intent 142 that satisfies the Find_POI input intent 136, and so on. In other words, the chain of intents 146 may include a number of temporally-spaced input intents 136 and a number of temporally-spaced output intents 142. In some embodiments, the intents 136, 142 are each embodied as an Extensible Mark-up Language ("XML") data structure and the chains of intents 146 are each embodied as linked lists containing or referencing such XML data structures. In other embodiments, other suitable implementations, including database tables and/or others, may be used to create and maintain the chains of intents 146.

Once the reasoner 138 has determined an appropriate course of action by which to respond to the user's inputs (which determination may be influenced, directly or indirectly, by intent analysis as described herein), the reasoner 138 communicates an output intent 142 to the system output generator 144. The output intent 142 specifies the type of system output 126 that the reasoner 138 believes (e.g., has a high degree of statistical confidence) is likely appropriate in response to the input intent 136. For example, if the input intent 136 is "SearchProduct," the reasoner 138 may determine by executing various task flows, analyzing the intent history, and/or conducting other artificial intelligence-based reasoning activities, that an appropriate output intent 142 may be "RecommendProductType(jewelry)," which results in system output 126 that includes an audio or visual presentation by the computing system 100 of a product recommendation for jewelry. Like the input intent 136, the output intent 142 may be embodied as a parameter list structure with each parameter having predefined attributes.

If the reasoner 138 specifies that the system output 126 is to be presented in a (system-generated) natural-language format, a natural language generator (NLG) module may be used to generate a natural language version of the output 126 that satisfies the output intent 142. To do so, the NLG module may map the output intent 142 to one or more NL responses 164. In some embodiments, the NL responses 164 may be embodied as templates for system-generated natural language output, including parameters representing fields in which specific data values may be inserted. For example, an NL response 164 may include the phrase "Would you like to view the customer reviews for the <product>?"), where <product> indicates a parameter that may be replaced with a data value obtained or derived from the user's NL input 112. A speech synthesizer or text-to-speech (TTS) module may be used to convert natural-language text generated by the natural-language generator (or even the un-processed output) to speech (e.g., machine-produced speech using a human or humanlike voice), and played through a speaker of the computing system 100, when such an output 126 is appropriate given the output intent 142 generated by the reasoner 138. Alternatively or additionally, the system output 126 may include visually-presented material (e.g., text, graphics, or video), which may be shown on a display screen of the computing system 100, tactile notifications, and/or other forms of output.

The illustrative VPA model 154 includes the NL grammars 156, input intents 158, task flows 160, output intents 162, and NL responses 164. In general, each or any of these components may be embodied as information, data structures, computer program logic or components, or a combination thereof. For example, some of the VPA components 166 may be embodied as rules, templates, data, arguments, parameters, and/or computer code. Some of these components may be domain-specific, while other components may be considered domain-independent or "generic."

As used herein, the term "domain" may refer to a category of information and/or activities in relation to which the VPA 110 may engage in a conversational natural language dialog with a computing device user. In some cases, "domain" may refer to the scope of a particular VPA application to which the VPA 110 is directed, or to a portion thereof. For example, a VPA application may be directed specifically to e-commerce shopping for "oil filters" (a single domain or concept) while another VPA application may be more broadly directed to "automotive supplies" (a broader category of items that may include oil filters, spark plugs, and other supplies. Still other VPA applications may be designed specifically for use in an automobile (e.g., as a driver's assistant), in connection with a financial services web site (e.g., as a banking assistant or "virtual teller"), to provide healthcare information or recommendations (e.g., as a doctor's assistant), or for any number of other specific or more generalized applications. As noted above, some examples of VPA components that may be included in the VPA model 154 are described in other patent applications of SRI International, such as, for example, the aforementioned Kalns et al., U.S. patent application Ser. Nos. 13/891,858 and 13/891,864. However, this disclosure is not limited thereby, and any suitable VPA components may be included in the VPA model 154 and/or otherwise utilized by the VPA engine 128 in accordance with the requirements of a particular design.

As described in more detail below with reference to FIG. 3, the COI analyzer 148 analyzes the chain(s) of intents 146 that are created over the course of one or more dialog sessions involving the user and the VPA 110. For example, the COI analyzer 148 may identify patterns of intents such as patterns of the same intent, type of intent, or combination of intents or intent types occurring multiple times throughout the COI. The COI analyzer 148 derives inferences 152 from the chain(s) of intents 146. Such inferences 152 may include, for example, system-generated conclusions about user-specific implicit or unstated preferences, habits, characteristics, opinions, goals or objectives. In some cases, the inferences 152 may be that the user's likely goal or objective of the dialog session (as determined by the VPA 110) has been fulfilled or not fulfilled. More generally, the inferences 152 may include information about the user or about a particular dialog session or group of dialog sessions to which the VPA engine 128 would otherwise not have access. Such inferences 152 may be incorporated into the creation of system output 126 by the VPA engine 128, or used to adjust the VPA's interpretation of the user's current or subsequent NL dialog input 112, or used to modify the VPA's processing of or response to the user's dialog input 112. In this way, the COI analyzer 148 can, for example, help the VPA engine 128 predict or anticipate a future goal, objective, or intent of the user and help the VPA engine 128 remember user-specific goals, objectives, preferences, habits, characteristics and/or opinions from one dialog session to the next.

Referring now to FIG. 2, the illustrative intent interpreter 134 is embodied as a number of computerized modules including a dialog context builder 210, a context intent extractor 216, and an intent merger 220, as well as the dialog context 212 and an intent mapping 222. Such modules and data structures are in communication with each other as needed by suitable communication links, such as any of those described herein. The intent interpreter 134 may be invoked by the input understanding module 130 to generate a final input intent 136 based on the user input 124, where the user input 124 may include one of or multiple different multi-modal inputs 112, 114, 116, 118.

The dialog context builder 210 generally operates during a dialog session involving the user and the VPA 110 (e.g., in "real time"), to create and maintain the dialog context 212, which includes a history of the intents 136, 142 that are instantiated during the current dialog session (e.g., a session-specific intent history). Alternatively or in addition, the dialog context 212 may include other contextual indicators, such as information that may be contained in or derived from the various multi-modal inputs 112, 114, 116, 118 at or around the time of occurrence of the user's current dialog input 112. Such contextual indicators may be instantiated in the dialog context 212 as various other types of input intents. Thus, the dialog context 212 allows the input understanding module 130 to incorporate various contextual information into its interpretation of the user's dialog input 112.

The dialog context 212 can be helpful, for example, if the input understanding module 130 is only able to partially interpret an instance of the user's NL dialog input 112. For instance, if the VPA 110 is implemented as a banking assistant and the user simply says, "ten dollars," the input understanding module 130 may not be able to determine, without reference to the dialog context 212 or by asking the user a follow-up question, whether the user wants to withdraw ten dollars from a bank account, transfer ten dollars from one account to another, or deposit ten dollars into an account. In this case, the input understanding module 130 may access the dialog context 212 to obtain additional information about the user's intended objective. Alternatively, the input understanding module 130 may add its partial interpretation of "ten dollars" to the dialog context 212 as an instantiation of a non-final input intent, which then may be resolved by subsequent dialog input 112 as described below. In the following description, instantiations of intents may be referred to simply as "intents" for ease of discussion.

In operation, the dialog context builder 210 receives an instance of a current input intent 214 from the sentence level interpreter 132. The dialog context builder 210 adds the current input intent 214 to the dialog context 212. The dialog context builder 210 may also add output intents 142 to the dialog context 212 (e.g., as received from the reasoner 138). The dialog context 212 or a portion thereof may be implemented as a computerized data structure such as a queue, another type of "first, in first out" linear data structure, or another suitable data type. In this way, the dialog context 212 keeps track of the intent history for the current dialog session.

If the current input intent 214 is not resolved before another dialog input 112 is received, the dialog context builder 210 may add the current input intent 214 to another portion of the dialog context 212, which may be embodied as a computerized data structure such as a stack, another type of "last in, first out" data structure, or another suitable data type. Such unresolved input intent 214 may be categorized as a non-final intent. The dialog context builder 210 may then process the next newly received current input intent 214. In some embodiments, the dialog context 212 maintains a history of all of the non-final intents. The dialog context 212 may be arranged so that the most recently received dialog input 112 can be addressed by the VPA 110 first.

The dialog context builder 210 also passes the current input intent 214 to the context intent extractor 216. The context intent extractor 216 accesses the dialog context 212 to determine whether any intents in the current intent history can be used to help interpret the current input intent 214. The context intent extractor 216 may, alternatively or in addition, utilize one or more of the COI-derived inferences 152 to help interpret the current input intent 214 or to determine which intent or type of intent to select from the dialog context 212 to use to interpret the current input intent 214.

As an example, suppose the VPA 100 is implemented as a mobile banking assistant. After scanning a check to be deposited, the user says, "and remember to send me a copy." Without additional information, the VPA 110 may not know what to do next, because it does not know what the user wants a copy of. However, a chain of intents analysis may reveal that, for this user, each time he or she scans a check, the user asks to be emailed a copy of the check, not just the transaction receipt. Accordingly, the context intent extractor 216 (or the sentence level interpreter 132 more generally) may apply the COI-derived inference 152 that, for this user, in this context, "copy means check" to interpret the current dialog input and associate the current dialog input with the proper input intent (e.g., "email check"). More generally, if the user's current dialog input is ambiguous, but we know he often requests "x" in this context, then that the VPA 110's interpretation of the input should bias toward "x" if that is a plausible interpretation.

The context intent extractor 216 executes computer logic to search the dialog context 212 according to one or more specified rules or parameters, which may be domain-specific. For example, the context intent extractor 216 may operate according to a rule that non-final intents in the dialog context 212 should be analyzed prior to final intents and/or a rule that more recently-received final intents should be considered before final intents relating to earlier parts of the current dialog session. Alternatively or in addition, the context intent extractor 216 may look for non-final intents that are of the same type as the current input intent 214. For example, if the VPA 110 is implemented as an entertainment assistant, and the current input intent 214 is "search movie" (which relates to user dialog input 112 that asks for a movie recommendation), the context intent extractor 216 may search the dialog context 212 for other instances of the "search movie" intent.

Continuing the entertainment assistant example, the context intent extractor 216 may utilize a COI-derived inference 152 to help select an intent from the dialog context 212 in the following manner. Upon receiving "search movie" as the current input intent 214, the context intent extractor 216 may send a COI analysis trigger 150 to the COI analyzer 148 in the form of a request to look in the global COI 312 for other "search movie" intents. The COI analyzer 148 may search the global COI 312 accordingly, and discover that in previous conversations, the user has responded positively when the VPA 110 has suggested movies starring a particular actor or actress (e.g., Brad Pitt). The COI analyzer 148 may infer that Brad Pitt is one of the user's favorite actors, and pass the actor's name to the context intent extractor 216 as a COI-derived inference 152. The context intent extractor 216 may then identify an input intent from the dialog context 212 that has "Brad Pitt" associated therewith as a data value.

Once the context intent extractor 216 identifies one or more intents in the dialog context 212 that satisfy the applicable search criteria, the context intent extractor 216 extracts the selected intent(s) from the dialog context 212 and retains the selected intent(s) at least temporarily (e.g., in cache memory) as extracted intents 218. As used herein, "extract" refers to an information extraction process, which may involve, for example, programmatically making a copy of the selected intents or removing the selected intents from the data structure in which they are stored in the dialog context 212. The context intent extractor 216 passes the current input intent 214 and the extracted intent(s) 218 to the intent merger 220.

The intent merger 220 combines or "merges" the extracted intent(s) 218 with the current input intent 214 to create a new version of the current input intent 214. Such new version of the current input intent 214 may still be non-final, in which case it may be added to the dialog context 212 as a non-final intent or referred back to the context intent extractor 216 for further interpretation. If the new version of the current input intent 214 is a final intent, it may be passed by the intent interpreter 134 to the reasoner 138 as a final input intent 136. For ease of discussion, it may be assumed that the intent merger 220 merges one extracted intent 218 with the current input intent 214 at any given time; however, it should be understood that multiple intents may be extracted from the dialog context 212 and merged with the current input intent 214. Moreover, it should be understood that, as the dialog context 212 may contain both input intents and output intents, either an input intent or an output intent may be extracted by the context intent extractor 216 and portions thereof may be merged with the current input intent 214. The intent merger 220 adds the "merged" version of the current input intent 214 to the dialog context 212, or, alternatively, passes the merged version of the current input intent 214 to the dialog context builder 210, which then adds the merged version to the dialog context 212.

In some embodiments, to combine the extracted intent 218 with the current input intent 214, the intent merger 220 accesses an intent mapping 222 and obtains therefrom intent relationship data 224. The intent relationship data 224 specifies one or more ways in which the current input intent 214 and the extracted intent 218 are related. For instance, the intent relationship data 224 may identify a parameter of the current input intent 214 that is of the same type as a parameter of the extracted intent 218. As another example, the intent relationship data 224 may indicate whether the current input intent 214 and the extracted intent 218 are of the same intent type.

The intent mapping 222 may be implemented as one or more database tables or other suitable data structures that associate intents with intent types and associate intent parameters with parameter types. Tables 1-2 below illustrate an example of an intent mapping 222 based on parameter types and intent types, using the entertainment assistant example. In Table 1, parameter names are associated with parameter types. In Table 2, intents are associated with their respective parameters.

TABLE 1

Parameter Mapping.

| Parameter Name | Parameter Type |
|---|---|
| Actor | Person_Type |
| Director | Person_Type |
| Person | Person_Type |

TABLE 2

Intents and Parameters.

| Intent Name | Parameters |
|---|---|
| Search Movie | date, title, director, actor, genre |
| Unspecified Request | person, genre, information, date |

An example of how the intent mapping 222 may be used to combine intents is as follows. Suppose the user says, "Looking for a movie from 1975." The VPA 110 translates this to a current input intent 214, "search movie," and populates the "date" parameter of such intent with "1975" as the data value. However, the "search movie" intent requires additional details to narrow down the search for an appropriate movie. Accordingly, the VPA 110 adds the current input intent 214 to the dialog context 212 and generates an output intent designed to result in the VPA 110 asking the user "Do you know who directed the movie?" The user replies, "It was a thriller by Hitchcock." The VPA 110 needs to reference the dialog context 212 in order to understand, from the previous rounds of dialog and/or other contextual information, what "it" means and what the user's overall goal or objective of the current input 112 is. However, the VPA 110 understands from information in the VPA model 154 that "thriller" is a movie genre and "Hitchcock" is the name of a person. Accordingly, the VPA 110 creates a new current input intent 214, "unspecified request," fills the "genre" field with "thriller," and fills the "person" field with "Hitchcock." Referring to the intent mapping 222, the intent merger 220 knows that the "person" field of the "unspecified request" intent and the "director" field of the "search movie" intent are of the same type, "person type." Further, the intent mapping 222 reveals that both the "search movie" intent and the "unspecified request" intent contain the "genre" field. Accordingly, the intent merger 220 inserts "thriller" into the "genre" field of the "search movie" intent and inserts "Hitchcock" into the "director" field of the "search movie" intent, and the VPA 110 can execute the desired search based on the new version of the "search movie" intent without asking the user any further questions.

In some embodiments, the intent mapping 222 may comprise an ontology, e.g., a computer-implemented knowledge representation framework. Such an intent ontology may define a structure for representing relationships between or among different types of information. For example, in an electric car charging example, the intent ontology may define a "Show POI" output intent as a "data source" for the "Get Charging Information" input intent. That is, the "Show POI" output intent may obtain information about a charging station that is close to the user's geographic location, which is presented to the user in response to a question such as "Where is the nearest charging station?" If the user later asks, "How long will the charging take?" the VPA 110 can deduce an appropriate response based on the data relationship between the "Show POI" intent and the "Get Charging Information" intent, and the information that is embedded in the fulfilled "Show POI" intent (e.g., as a result of executing a task flow 160). In other words, the VPA 110 can leverage the "Show POI" output intent in reasoning about how to fulfill the request for charging information, even though it occurred earlier in the dialog session (e.g., prior to intervening dialog input 112), and even if it did not result in a back-end transaction, because the information is retained in the dialog context 212.

By maintaining and analyzing the dialog context 212, the intent interpreter 134 can enable the VPA 110 to better reason about earlier parts of the same conversation between the user and the VPA 110, particularly completed intents that have no back-end persistence. Additionally, the intent interpreter 134 can reason about which incomplete intents should be processed next, in accordance with the dialog context 212, and help the VPA 110 respond appropriately when the user makes an implicit reference to an earlier part of the conversation. Such implicit references may include temporal indicators such as "first" ("Let's go back to the first set of jeans"), "last" ("Reverse my last transfer"), "again" ("Tell me again where the charging station was"), demonstrative words such as "that" ("What can I do in that area at that time?"), or even the word "the" ("the charging station").

Referring now to FIG. 3, the illustrative chain of intents analyzer 148 includes a number of computerized modules including a global COI builder 310, a meta-intent recognizer 316, a meta-intent reasoner 322, and a communication module 328. Such modules and data structures are in communication with each other as needed by suitable (e.g. physical or logical) communication links, such as any of those described herein. As noted above, the COI analyzer 148 analyzes sets of intents relating to one or more previous dialog sessions. In some embodiments, the chain of intents analyzer 148 conducts its analysis offline (i.e., outside the scope of a "live" or "real time" conversation).

The global COI builder 310 operates in a similar fashion to the COI builder 140 in that it maintains a set of intents as, e.g., a searchable database. However, the global COI builder 310 maintains a set of intents (or a number of sets of intents) that spans multiple dialog sessions involving the user and the VPA 110, and may additionally include sets of intents generated during VPA dialog sessions involving other users, as mentioned above. More specifically, the global chain of intents 312 may include multiple local chains of intents 146, which collectively span multiple dialog sessions between the user and the VPA 110, and/or the global chain of intents 312 may include one or more local chains of intents 146 generated from dialog sessions involving the VPA 110 and other users. Further, in some embodiments, the global COI builder 310 and the COI builder 140 maintain sets of intents within the same data structure (e.g., a searchable database).

The global COI builder 310 may update the global chain of intents 312 on a periodic basis or in response to a triggering event, such as each time a new local chain of intents 146 is created by the COI builder 140. The global chain of intents 312 may be embodied as, for example, a linked list including or referencing a number of local chains of intents 146. In some embodiments, the intent information in the COI 312 may be indexed or otherwise sorted for efficient use by the COI analyzer 148.

The meta-intent recognizer 316 analyzes the global chain of intents 312 or a portion thereof, on a periodic basis or in response to a triggering event, such as a request from the intent interpreter 134 or a request from an external computer application. In doing so, the meta-intent recognizer 316 may extract all or a subset of the intents from the global chain of intents 312 and analyzes the extracted subset of COI 318. For instance, the meta-intent recognizer 316 may extract a subset of intents corresponding to a specific time period, a specific dialog session, a specific topic, or any other desired criteria.

The meta-intent recognizer 316 generates, as a result of its analysis of the extracted COI 318, one or more meta-intents 320. The meta-intents 320 represent higher-level goals, objectives, or other information derived from the extracted COI 318, and generally include implied or unstated information that the VPA 110 would not otherwise be able to discern. For example, the meta-intents 320 may reveal a user's desired price range for the purchase of a product, the number of different products that were discussed during a dialog session, and/or whether a product search was started but not completed. To determine the meta-intents 320, the meta-intent recognizer 316 may apply domain-specific rules or heuristics or recognize various patterns in the chains of intents 312 (or more specifically, in the extracted COI 318) using other artificial intelligence-based techniques.

In some embodiments, the meta-intents 320 may be predefined such that the meta-intent recognizer 316 may "fill" various parameters of the predefined meta-intents 320 with data values derived from the COI 312 through the use of information search and retrieval techniques. For instance, the meta-intent recognizer 316 may create a "VPA dialog personalization record" for each user based on a set of pre-defined meta-intents. An example of such a personalization record, which may be automatically created and maintained by the VPA 110 (or more specifically, the COI analyzer 148), is shown in Table 3 below.

TABLE 3

Intent-based Personalization Record.

| Meta-Intent | User 1 | User 2 |
| --- | --- | --- |
| Price Range | <=$500 | <=$500 |
| Product Categories Searched | User Initiated: jewelry VPA Initiated: none | User Initiated: coat VPA Initiated: jewelry, phone, tablet |
| Specific Product Searched | diamond necklace | Tablet, coat, |
| Product Purchased | Diamond necklace | none |

In the example of Table 3, the defined meta-intents 320 include the user's preferred price range, the product categories actually searched, the specific products searched, the specific products purchased, and whether a product search was deferred at the conclusion of the dialog session. The meta-intent recognizer 316 searches the COI 312 to obtain the data values associated with each of the meta-intents 320 using any suitable information retrieval techniques (e.g., a query language such as XQuery or XQL). Although not specifically shown, it should be understood that the meta-intents 320 and the associated data values may be stored in persistent memory for later use; for example, a portion of the chain of intents 312 may be used to store the meta-intents 320 and/or the personalization records. Alternatively or in addition, the meta-intents 320 may be copied at least temporarily to, e.g., cache memory, for use by the meta-intent reasoner 322.

As with intents, the meta-intents 320 may be domain-specific. Accordingly, whereas the meta-intents 320 shown in Table 3 may be appropriate for an e-commerce application of the VPA 110, other meta-intents 320 may be defined for other types of VPA applications, such as health care, financial services, automobile, and/or others. In some embodiments, the meta-intents 320 may be generated by the VPA 110 ad hoc based on available intent and contextual information.

While some of the information contained in the meta-intents 320 may include information that is explicitly stated by the user during a dialog session (e.g., "$500"), such information may not be retained by the VPA 110 beyond the current round of dialog or if the dialog does not result in the execution of a back-end transaction. However, such information can be retained in the chain of intents 312 as discussed above. In some embodiments, intent information may be available to the VPA 110 via a back-end system or database that creates and stores records of transactions; however, even in such instances, the meta-intents 320 may be useful to determine contextual information or other information that may be relevant to a future dialog session of the user. For example, from User 2 of Table 3, the VPA 110 may infer that, in a future dialog session with the VPA 110, the user may be interested in searching details about tablets or coats, given the prior interest in those product categories.

The meta-intent recognizer 316 passes the meta-intents 320 to the meta-intent reasoner 322. The meta-intent reasoner 322 selects one or more meta-rules 326 from a knowledge base of meta-rules 324, and applies the selected meta-rules 326 to the meta-intents 320 to generate the COI-derived inferences 152. The meta-intent reasoner 322 may select the applicable meta-rules 326 based on pre-defined criteria, which may be domain-specific. In general, the meta-rules 324 may specify conditions and then conclusions or results that follow from the conditions, depending on whether the conditions are met or not met by the meta-intents 320 and/or associated data values. Such conclusions or results may be or may not be used to generate the COI-derived inferences 152. The meta-rules 324 may be embodied as, for example, computer code to execute Boolean logic. As an example, a meta-rule 324 may specify that "if the COI 318 contains more than y product search intents and no product purchased intents, then product search is deferred," where y may be a parameter whose data value may be variable based on the requirements of a particular design or implementation of the VPA 110.

Alternatively or in addition, the meta-rules 324 may include rules that help the meta-intent reasoner 322 determine how to present the COI-derived inferences 152 to the VPA engine 128 or other requesting application. For example, if the COI-derived inference 152 is that the user has "deferred a product search," the meta-rules 324 may specify that the VPA 110 should ask the user if they wish to continue the search at the start of the next dialog session. In other words, the meta-rules 324 may specify logic to apply to the meta-intents 320 to generate the inferences 152 as well as the actions that the VPA 110 may wish to take based on the inferences 152. The inferences 152 may be stored in memory, e.g., in the global chain of intents 312, in some embodiments.

The communication module 328 formulates the inferences 152 and/or the meta-intents 320 from which the inferences 152 are derived for communication to the VPA engine 128 and/or to other computer applications. The communication module 328 may communicate the meta-intents 320 and/or inferences to the VPA engine 128 (e.g., for use in modifying a user greeting at the beginning of the next VPA session, or for use in interpreting, processing, or responding to user inputs 112). For example, the communication module 328 may communicate meta-intents 320 and/or inferences 152 to the reasoner 138 for use in executing task flows 160 or populating output intents 142. Further, the communication module 328 may communicate meta-intents 320 and/or inferences 152 to the system output generator 144 for use in generating the system output 126.

Figure 4:
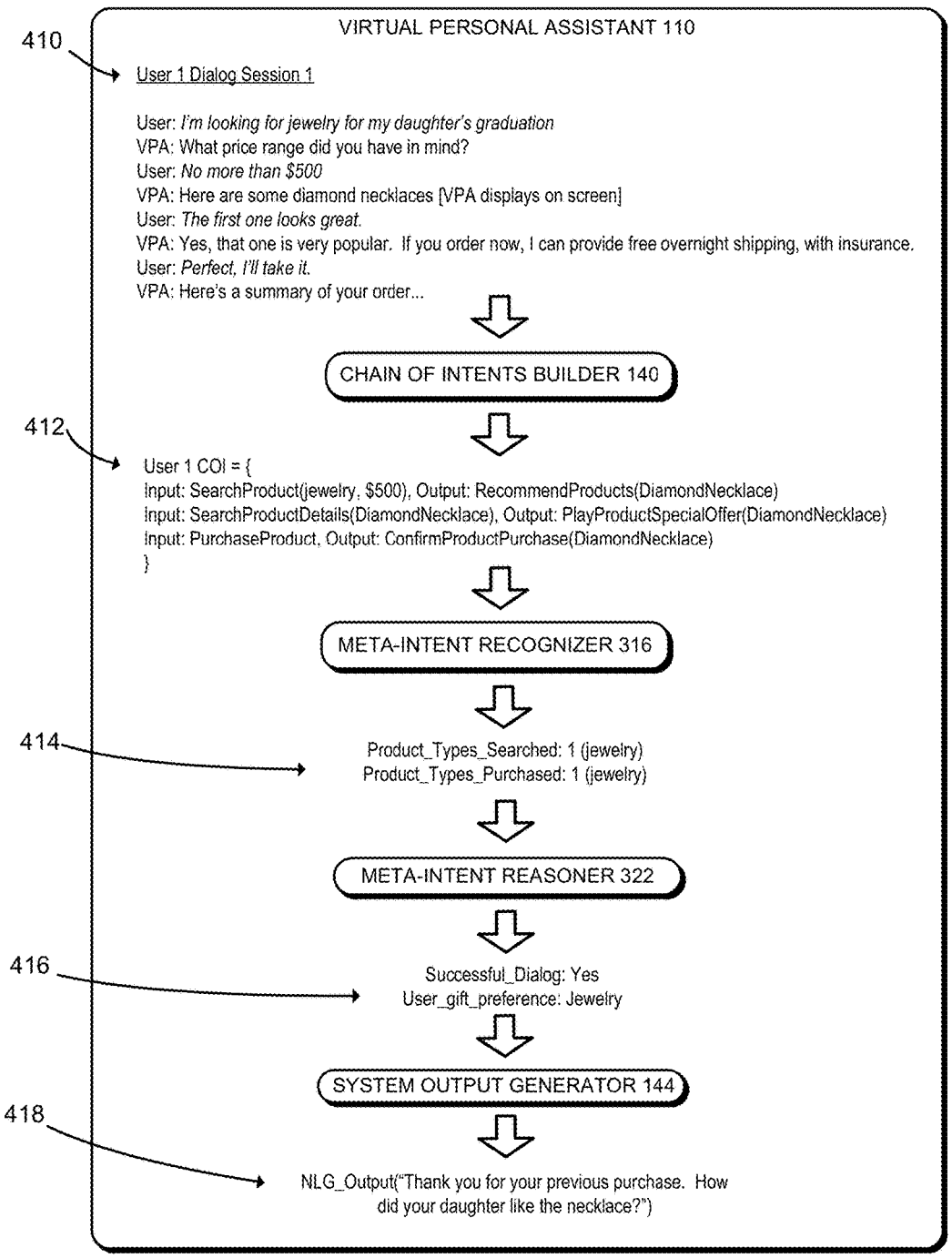
FIG. 4 is a simplified flow diagram illustrating an example of the VPA generating and analyzing a chain of intents based on a user interaction with the platform of FIG. 1.
Figure 5:
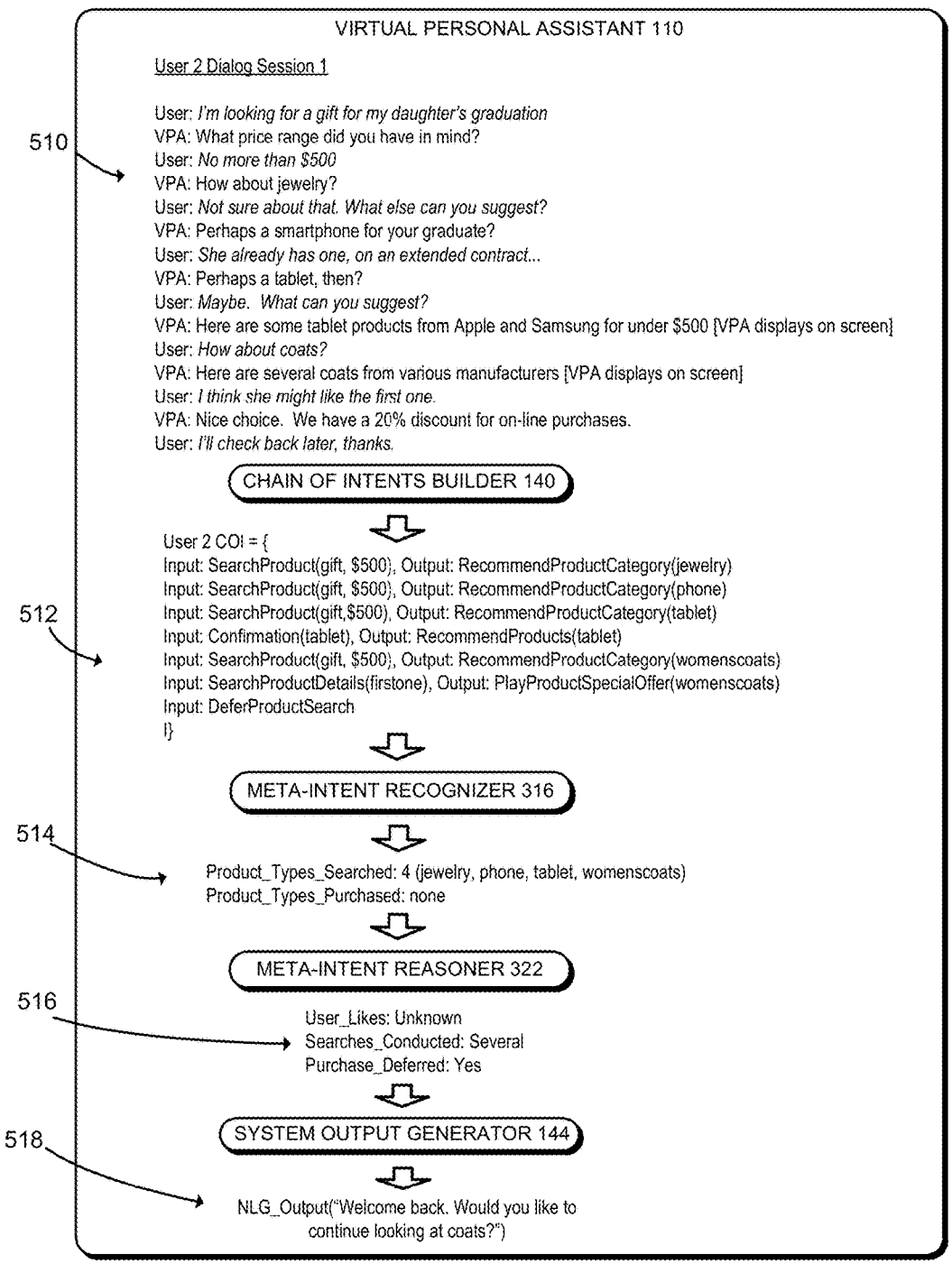
FIG. 5 is a simplified flow diagram illustrating an example of the VPA generating and analyzing a chain of intents based on another user interaction with the platform of FIG. 1.

Referring now to FIGS. 4-5, a chain of intents analysis is illustrated for two different user dialog sessions, to show how the chain of intents analysis may result in unique outcomes for different users' dialog sessions. In FIG. 4, a chain of intents 412 is generated by the chain of intents builder 140 based on a natural language dialog 410 between the user and the VPA 110. In the example, the input understanding module 130 has previously generated the input intent 136 "SearchProduct" in response to the user's statement "I'm looking for jewelry for my daughter's graduation," and the reasoner 138 has previously generated the output intent 142 "RecommendProducts (DiamondNecklace)" based on the "SearchProduct" input intent 136. Likewise, a "Search ProductDetails" input intent 136 is generated in response to the user's dialog inputs, "Not more than $500" and "The first one looks great," and the output intent "PlayProductSpecialOffer" results in the system output offering free overnight shipping.

The meta-intent recognizer 316 analyzes the COI 412 and generates the meta-intents 414, which indicate that the user searched one product type and purchased a product from the same product type that was searched. In this case, the meta-intent reasoner 322 applies meta-rules 324 to produce the inferences 416, namely, that the dialog was successful and that the user prefers to give jewelry as a gift. The system output generator 144 translates the inferences 416 and/or meta-intents 414 into a natural language message 418, which is presented to the user as system output 126.

Referring now to FIG. 5, another chain of intents 512 is generated by the chain of intents builder 140 based on different dialog 510 between the user (or another user) and the VPA 110. As illustrated, the VPA engine 128 generates a different set of appropriate input intents 136 and output intents 142 based on the particular NL input 112 of the user that is presented in the particular dialog session. The dialog session of FIG. 5 contains many more interactions than the dialog session of FIG. 4, and thus results in a chain of intents 512 having a greater number of intent pairs. Additionally, the user did not purchase an item during the dialog session. From the COI 512, the meta-intent recognizer 316 generates the meta-intents 514, which indicate that the user searched four different product types and did not make any product purchases. Based on the meta-intents 514, the meta-intent reasoner 322 generates inferences 516, which include an inference that a purchase has likely been deferred to a future dialog session. The system output generator 144 maps the "product deferred" inference to a NLG output that will be presented to the user upon the initiation of the next dialog session.

Figure 6:
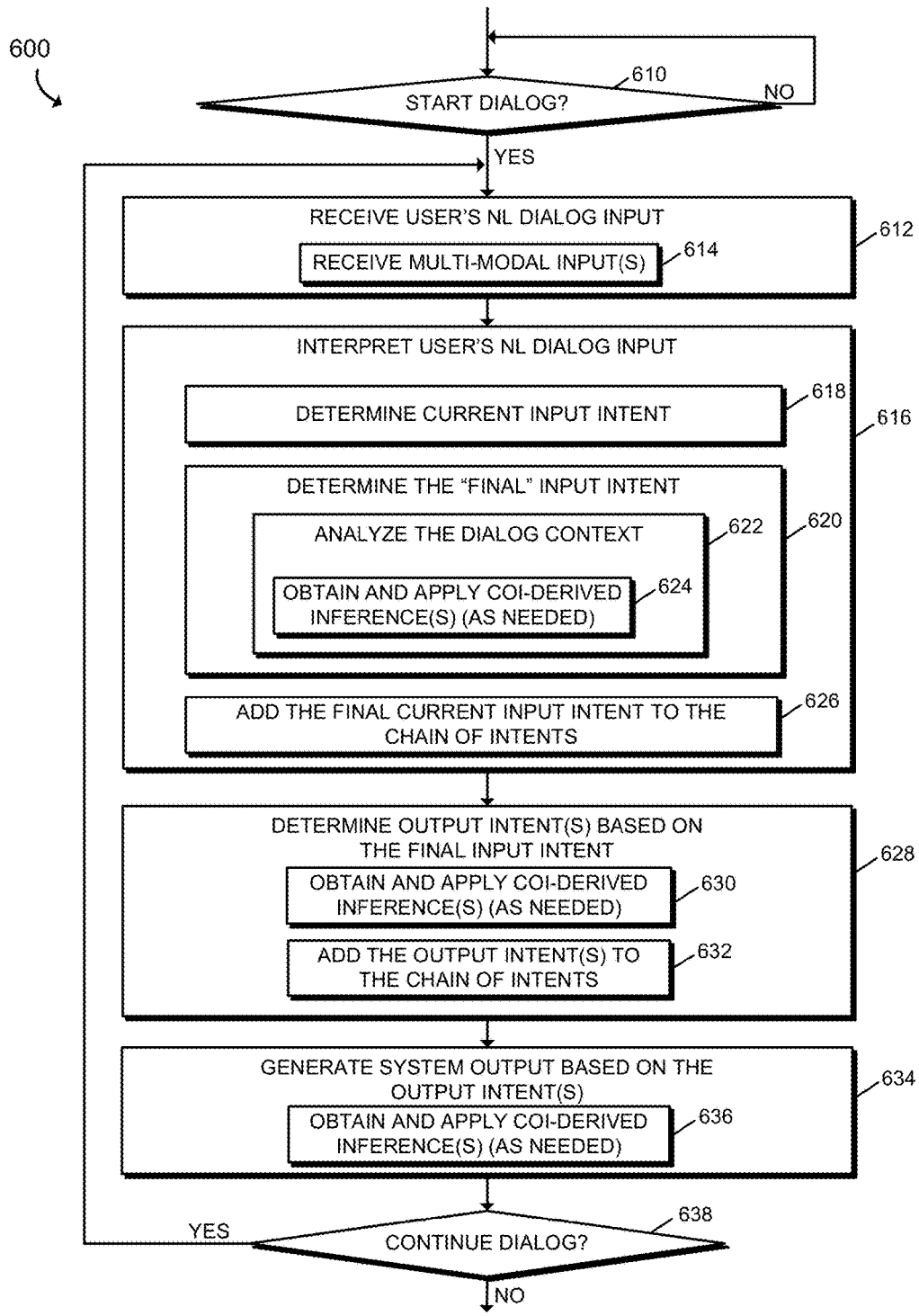
FIG. 6 is a simplified flow diagram of at least one embodiment of a method for analyzing and personalizing a user's dialog experience with the VPA of FIG. 1.

Referring now to FIG. 6, an illustrative method 600 for analyzing and personalizing a user's dialog experience with the VPA 110 is shown. The method 600 may be embodied as computerized programs, routines, logic and/or instructions executed by the computing system 100, for example by the VPA 110. At block 610, the system 100 determines whether to start a dialog between the VPA 110 and the user. The receipt of an NL user input 112 generally triggers the start of a dialog between the VPA 110 and the user; however, in other embodiments, the triggering event may include, additionally or alternatively, other multimodal inputs 114, 116, 118, or some specific input (e.g., NL dialog including the phrase "launch VPA"). If no such event has occurred (e.g., the user is silent and there are no other triggering events), the computing system 100 simply remains at block 610 or does nothing.

At block 612, the computing system 100 receives the user's natural language dialog input 112. In some embodiments, at block 614, the computing system 100 may also receive other multi-modal inputs 114, 116, 118 from the user or various components or peripheral devices of the system 100. For example, all or portions of the user's spoken natural language input 112 may be captured with a microphone or other audio input device of the computing system 100, and stored in memory of the computing system 100. In the case of text-based natural language input 112, the input 112 may be captured by, for example, a touch pad, key pad, or touch screen of the computing system 100. In some cases, gesture inputs may be captured by, e.g., a camera, which may be integrated with or otherwise in communication with the computing system 100. In any event, the captured inputs 112, 114, 116, 118 may be at least temporarily stored in memory of the computing system 100.

At block 616, the computing system 100 interprets the user's natural language input 112 using intent analysis. In doing so, at block 618, the computing system 100 determines the current input intent based on the user's natural language input 112. The computing system 100 may interpret the NL input 112 in view of any other multi-modal inputs 114, 116, 118, which themselves may be reduced to intents by, e.g., the input understanding module 130. As discussed above, the computing system 100 (e.g., the sentence level interpreter 132) applies, for example, syntactic, grammatical, and/or semantic rules to the NL dialog input 112 to distill the natural language input to its significant words, and determines the current intent of the NL input 112 in view of the multi-modal inputs 114, 116, 118 (if present).

At block 620, the computing system 100 determines a final input intent. To do this, the system 100 analyzes the dialog context at block 622. For example, the system 100 may engage in context intent extraction and intent merging as described above and in more detail below with reference to FIG. 7. Further, at block 624, the system 100 may obtain the results of any intent analysis performed by, e.g., the COI analyzer 148. That is, the system 100 may incorporate one or more inferences 152 derived from the COI 312 or a portion thereof, into the determination of a final current input intent. Of course, if no intent analysis has been performed resulting in any inferences 152, or for other reasons, the computing system 100 may skip block 624. At block 626, the system 100 adds the final current input intent to the chain of intents 146 for the current dialog session.

At block 628, the computing system 100 executes business logic (e.g., task flows 160) and determines the output intent(s) corresponding to the final input intent generated at block 620. That is, the computing system 100 determines and executes a likely appropriate task on the user's behalf and/or generates a likely appropriate system response to the user's intended goal or objective as reflected in the final current input intent. At block 630, the system 100 may obtain and apply any pertinent COI-derived inferences 152 to the output intent determination. At block 632, the computing system 100 adds the output intent(s) to the chain of intents 146 for the current dialog session.

At block 634, the computing system 100 generates system output 126 based on the output intent(s) determined at block 628. At block 636, the system 100 may obtain and apply any pertinent COI-derived inferences 152 to the generation of the system output 126. At block 638, the computing system 100 determines whether to continue the current dialog session. The manner in which the computing system 100 makes such a determination may vary depending on the particular implementation of the VPA 110. For example, the computing system 100 may determine to continue the dialog with the user if the user responds to the generated system output 126 within a specified amount of time. If the dialog session is continued, the system 100 returns to block 612 in which the computing system 100 receives the user's further NL dialog input 112 (i.e., the next input). If the dialog session is not continued, the method 600 terminates at block 638.

Figure 7:
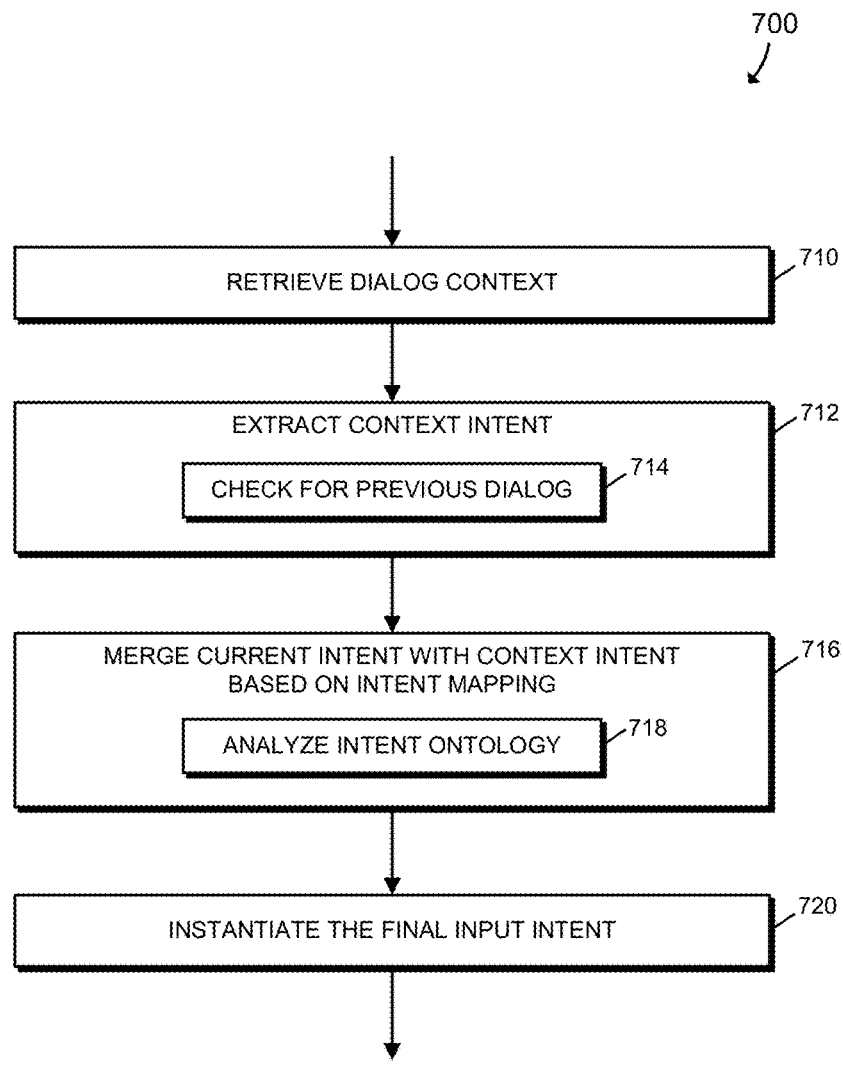
FIG. 7 is a simplified flow diagram of at least one embodiment of a method for determining an input intent with the VPA of FIG. 1.

Referring now to FIG. 7, an illustrative method 700 for determining an input intent of a user is shown. The method 700 may be embodied as computerized programs, routines, logic and/or instructions executed by the computing system 100, for example by the VPA 110. The method 700 illustrates one embodiment of the analysis performed at block 622 of FIG. 6. At block 710, the system 100 retrieves the dialog context. For example, the computing system 100 may interpret other multi-modal inputs 114, 116, 118 and/or receive other contextual data, at block 710. Additionally or alternatively, the computing system 100 may retrieve intent information from the dialog context 212. At block 712, the computing system 100 extracts a context intent from the retrieved context data. In doing so, the computing system 100 may determine whether there is previous dialog in the dialog context 212, at block 714. As described above, the computing system 100 may leverage one or more COI-derived inferences 152 in determining the context intent, and/or the computing system 100 may select a context intent based on defined criteria such as whether an intent is complete or incomplete.

At block 716, the computing system 100 merges the current intent with the context intent based on, e.g., the intent mapping 222. As discussed above, the intent mapping 222 or portions thereof may be embodied as a database or an ontology. Thus, at block 718, the system 100 may analyze an intent ontology to determine a relationship between the current intent and the context intent.

To merge the context intent and the current intent, the system 100 may insert data values from the context intent into the corresponding fields of the current intent. In some embodiments, if the current intent and the context intent are of the same type (i.e., the same predefined intents), the computing system 100 may derive a new intent of the same type including the parameters from both the context intent and the current intent. The computing system 100 may similarly combine parameters of the intents if the intent mapping 222 defines a hierarchical structure (i.e., an inheritance-based structure) in which one of the context intent or current intent is a child of the other. If the intents are of different types, the mapping 222 may otherwise define how to merge the context intent and the current intent, based, e.g., on domain-specific rules. In some embodiments, the computing system 100 may determine that the most likely appropriate input intent is different from the representation of both the current intent and the context intent and, therefore, "merging" the intents may result in the creation of an input intent of a different type than either the context intent or the current intent. At block 720, the computing system 100 instantiates the final input intent based on the merged intents.

Figure 8:
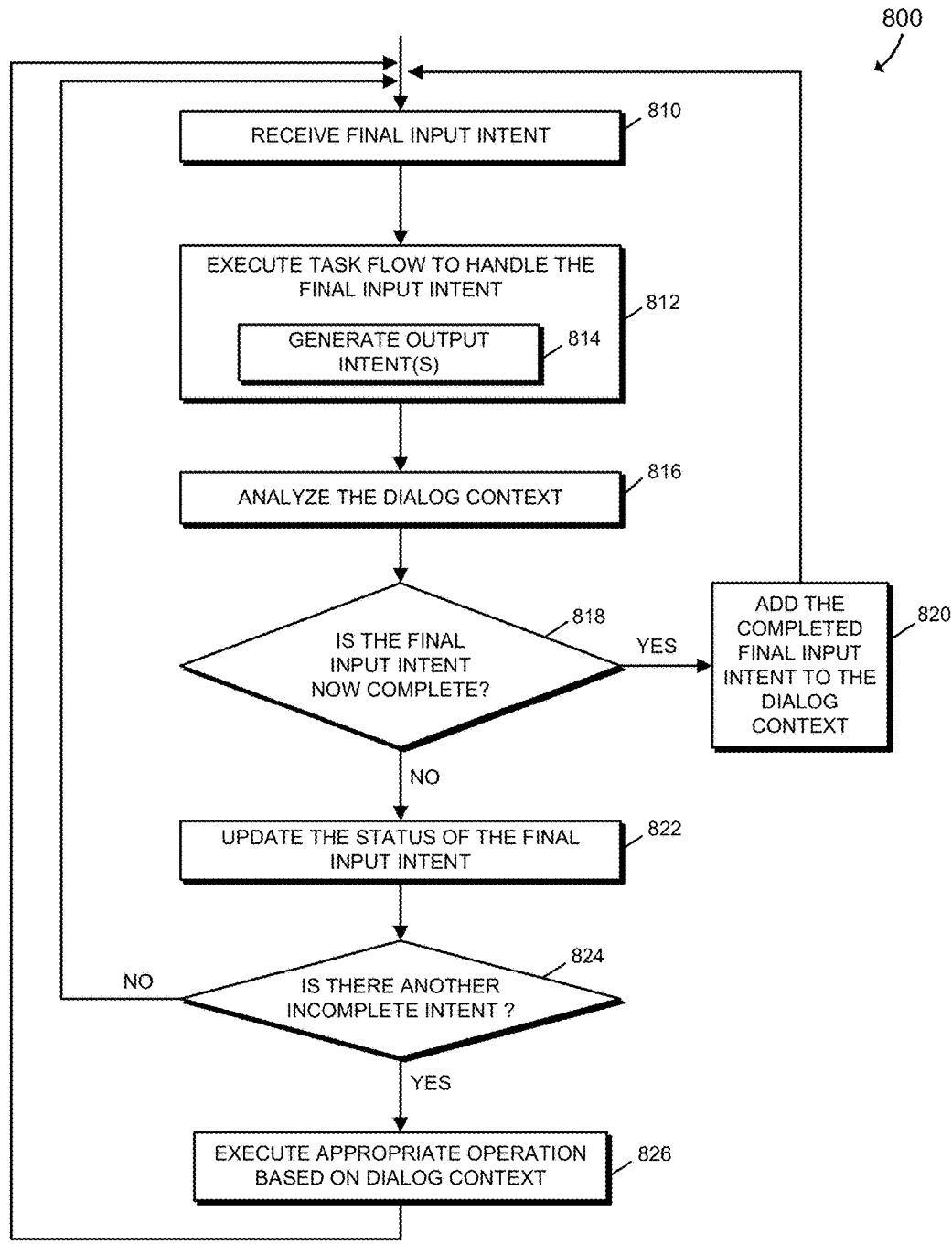
FIG. 8 is a simplified flow diagram of at least one embodiment of a method for processing an input intent with the VPA of FIG. 1.

Referring now to FIG. 8, an illustrative method 800 for processing an input intent is shown. The method 800 may be embodied as computerized programs, routines, logic and/or instructions executed by the computing system 100, for example by the VPA 110. At block 810, the computing system 100 (e.g., the reasoner 138) receives a final input intent (e.g., from the input understanding module 130). At block 812, the system 100 executes a task flow 160 to process the final input intent 136, e.g., to generate an appropriate system response to the user's dialog input. In doing so, the system 100 may instantiate one or more output intents 142 as described above (block 814).

At block 816, the system 100 analyzes the dialog context. For example, the system 100 may retrieve information from the dialog context 212, the global chain of intents 312 and/or the local chain(s) of intents 146, which the system 100 may use to determine the status of the final input intent 136, or for other purposes. In some embodiments, the system 100 may analyze the dialog context and/or chain of intents-derived inferences to determine user habits or preferences. For example, in a banking assistant example, analysis of the dialog context (e.g., the chain of intents 312) may indicate that a user always checks their account balance after requesting a fund transfer. Accordingly, if the user issues a dialog request to check their account balance, based on the intents analysis, the system 100 may proceed without further dialog exchange with the user to automatically execute the "check balance" system operation.

As noted above, the system 100 keeps track of the status of each input intent 136 (e.g., in the dialog context 212). At block 818, the system 100 determines whether the status of the final input intent 136 is complete. If the final input intent 136 is complete, the completed final input intent is added to the dialog context 212 at block 820 (e.g., to a completed intent queue), and the system 100 returns to block 810, where the system 100 receives the next final input intent. If the final input intent 136 is incomplete, the system updates information relating to the status of the final input intent 136 at block 822 (e.g., by updating a stack of incomplete intents).

The status information of the final input intent 136 may be updated if, for example, the final input intent 136 was previously indicated as being incomplete and remains incomplete after a subsequent round of dialog (e.g., after a retrial). In this way, the system 100 can keep track of the number of dialog iterations that are performed by the VPA 110 on each of the final input intents 136. Such information may be used to influence the VPA 110's response to a subsequent dialog input 112. For example, if the number of iterations has exceeded a defined number x (which may be specified according to the requirements of a particular design or implementation of the VPA 110), the system 100 may execute logic to simply go ahead and perform an operation rather than asking the user for confirmation.

At block 824, the system 100 determines whether there is another incomplete intent in the dialog context. If there are no other incomplete intents, the system 100 returns to block 810, where the system 100 receives the next final input intent. If there is another incomplete intent in the dialog context, the system 100 attends to the incomplete intent. As noted above, incomplete intents may be arranged in a stack or other suitable type of data structure (e.g., a first in, first out data structure), in some embodiments. As such, the system 100 may process the most recently added incomplete intent (e.g., the intent on the top of the stack) before attending to other incomplete intents.

The system 100 executes an operation in furtherance of the completion of the next-to-be processed incomplete intent at block 826. For instance, the system 100 may ask the user if they wish to continue processing the incomplete intent. As an example, suppose in a banking assistant application, the user first asks the VPA 110 to perform a fund transfer (one instance of dialog input 112) and then asks the VPA 110 about their account balance. The VPA 110 may respond to the account balance inquiry first (e.g., by processing a "check account balance" final input intent) and then check for other incomplete intents. Since the VPA 110 has not yet responded to the user's request to transfer funds, the corresponding "fund transfer" intent will have a status of incomplete. Accordingly, at block 826, the VPA 110 may, after responding to the account balance inquiry, ask the user if they wish to continue with the fund transfer. Alternatively, the VPA 110 may simply continue to process the fund transfer request without asking the user for confirmation. Following block 826, the system 100 returns to block 810, where it awaits another final input intent.

Example Usage Scenarios

Figure 9:
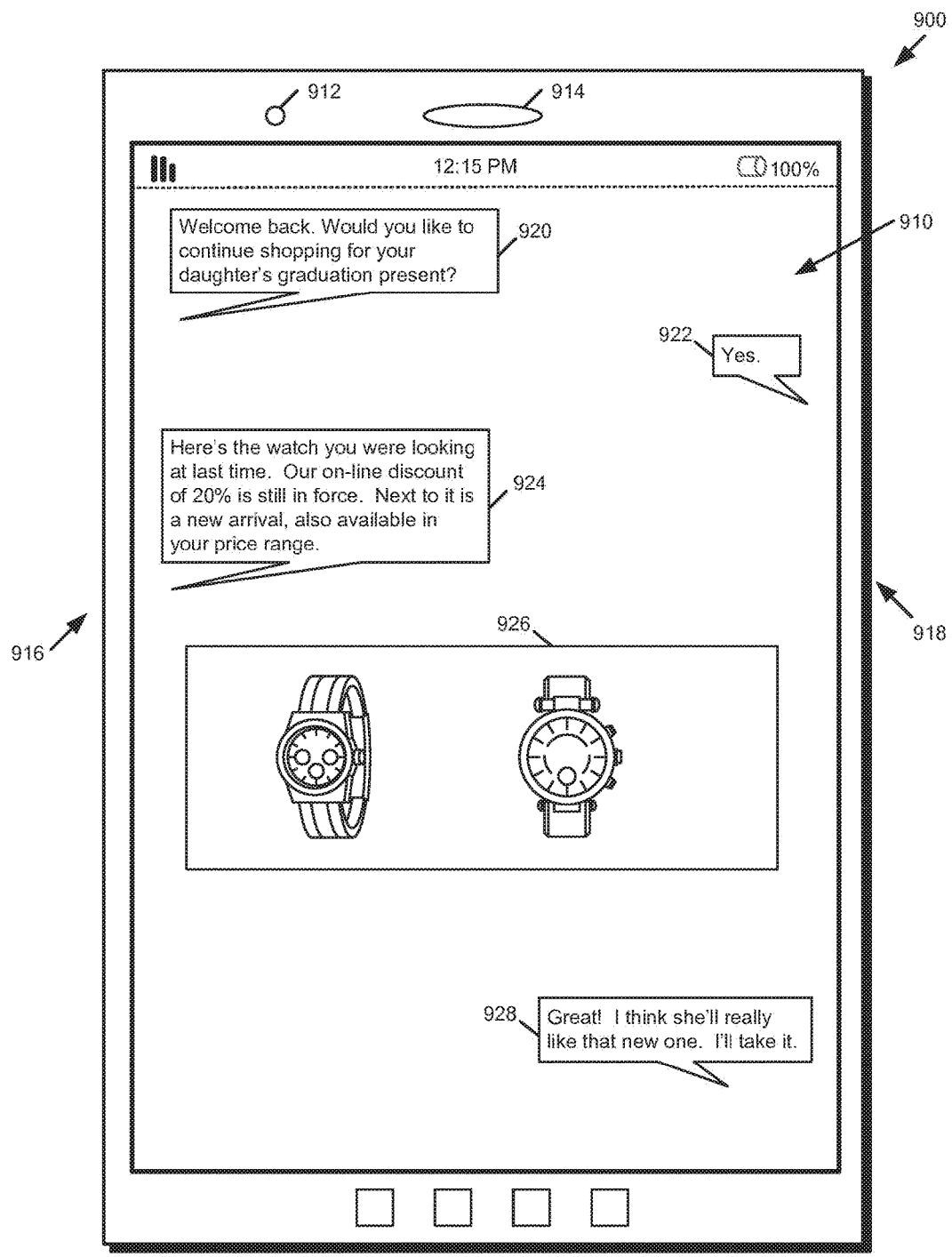
FIG. 9 is a simplified illustration of a user's dialog interaction with a computing device that may occur in connection with the use of at least one embodiment of the VPA of FIG. 1.

Embodiments of the VPA 110 and/or the various intent analyses performed thereby can be used to enhance and/or personalize the user's dialog experience with the VPA 110, or for other purposes. Referring now to FIG. 9, an example of a human-machine natural language dialog interaction that may be conducted by the VPA 110 is shown. The interaction involves a user and a computing system 900. Illustratively, the computing system 900 is embodied as a mobile electronic device such as a smart phone, tablet computer, smart appliance, or wearable computing device, in which a number of sensing devices 912, 914 are integrated (e.g., two-way camera, microphone, etc.). The interaction is illustrated as occurring on a display screen 910 of the system 900; however, all or portions of the interaction may be accomplished using audio, e.g., a spoken natural-language interface, rather than a visual display. The interaction involves user-supplied natural-language dialog 918 and system-generated dialog 916. In the illustrated example, the system 900 initiates the interaction at box 920 as a new dialog session, although this need not be the case. For example, the interaction may be a continuation of an earlier-started dialog that had been temporarily "paused" by the user.

At box 920, using the VPA 110, the system 900 issues a natural language statement (e.g., speech or other natural language input). Specifically, the system 900 welcomes the user back (e.g., to resume a previously concluded conversation) and asks whether the user would like to return to looking for a gift for his or her daughter. As discussed above, the dialog of box 920 may be informed by a COI-derived inference 152. In the illustrative embodiment, an analysis of the COI 312 indicated that the user did not purchase an item in the previous dialog session and may like to resume searching for a product. The previous dialog may have been similar to the dialog 510 of FIG. 5 between the user and the VPA 110. At box 922, the user affirms his or her desire to resume the search for a graduation gift. After receiving the user's response, the VPA 110 displays the gift (i.e., a watch) that the user was considering during former dialog and reminds the user of a previously-stated discount at box 924. The VPA 110 also identifies, based on the inferences 152 and/or other contextual information derived from the dialog context 212, another gift that the user may be interested in purchasing, and displays that gift alongside the previous gift at box 926. At box 928, the user indicates that he or she would like to purchase the "new one." Although not explicit in the dialog, the VPA 110 interprets the ambiguity associated with the phrase "new one" to refer to the newly displayed watch rather than "an unused watch" based on the inferences 152 and/or other contextual information derived from the dialog context 212.

Figure 10:
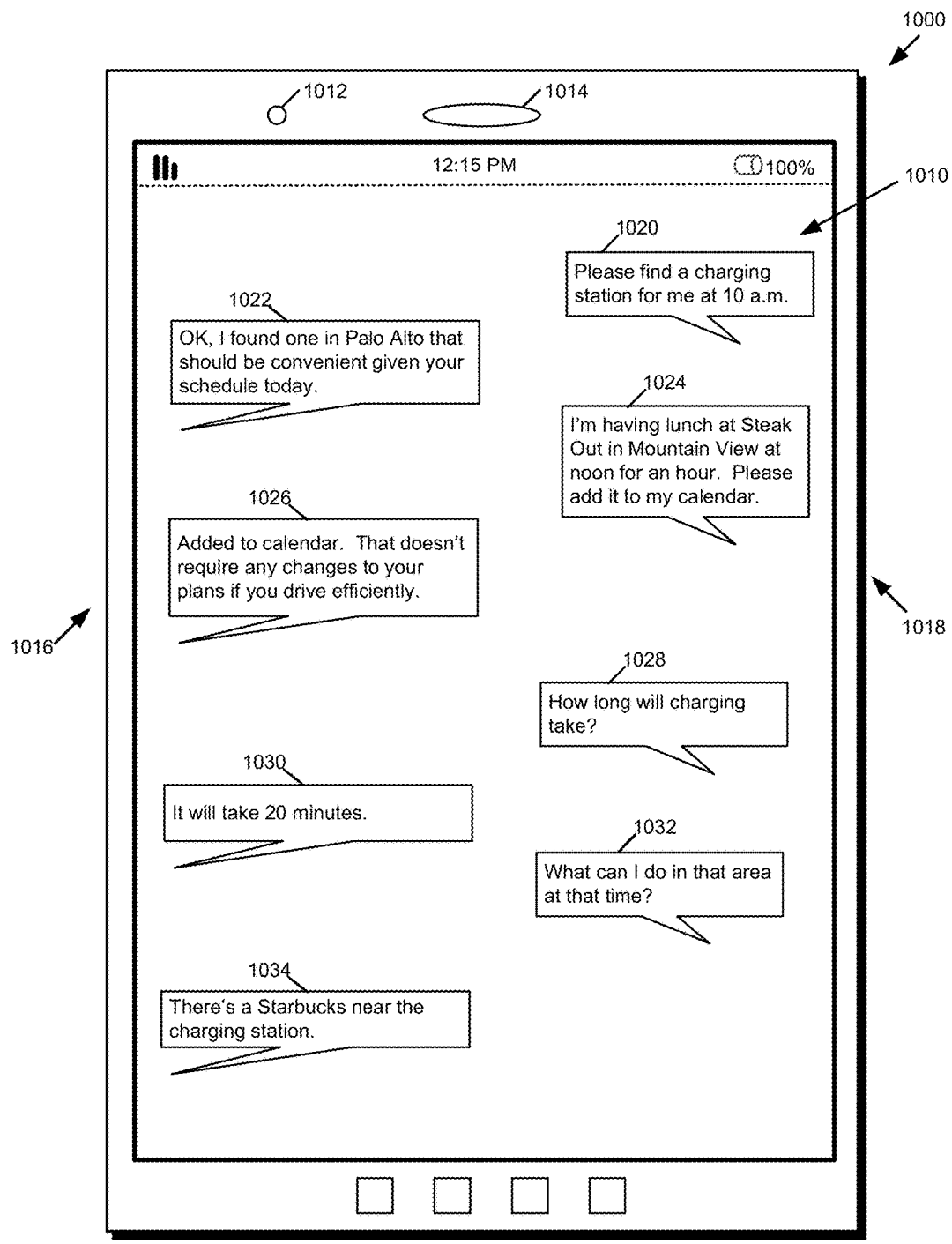
FIG. 10 is a simplified illustration of another example of a user's dialog interaction with a computing device that may occur in connection with the use of at least one embodiment of the VPA of FIG. 1.

Referring now to FIG. 10, another example of a human-machine interaction that may be enhanced or at least informed by the VPA 110 is shown. The interaction involves a user and a computing system 1000, which is, illustratively, structurally and functionally similar to the computing system 900 described above, and like reference numerals generally correspond to similar elements as described above with reference to FIG. 9 (e.g., 1012 corresponds to 912, etc.). The interaction involves user-supplied natural-language dialog 1018 and system-generated dialog 1016. In the illustrated example, the user initiates the interaction at box 1020, although this need not be the case. For example, the interaction may be a continuation of an earlier-started dialog, or the computing system 1000 may autonomously initiate the dialog (e.g., in response to one or more multi-modal inputs 114, 116, 118, or to resume a previous dialog as in FIG. 9).

At box 1020, the user issues a natural language statement (e.g., speech or other natural language input). Specifically, the user requests the system 1000 to find a charging station (i.e., for an electric vehicle) at 10:00 a.m. Using the VPA 110, the system 1000 responds, at box 1022, indicating that a conveniently located charging station has been identified. At box 1024, the user requests that a lunch date be added to his calendar. In response, the system 1000 indicates that the calendar item has been added and that the new plans do not affect the user's plans to charge the user's vehicle, at box 1026. In doing so, the system 1000 "remembers," using one or more of the intent analyses described herein, that the user had already spoken about plans to charge the vehicle earlier in the dialog session. At box 1028, the user asks, "How long will charging take?" Whereas existing systems would likely have no ability to answer this question, the intent analysis using the dialog context 212 and/or inferences 152 allows the system 1000 to remember the details about the charging station discussed earlier, and formulate a response. In existing systems, such a question is likely outside the scope of the system's available responses, because earlier-stated but non-persistent contextual information is required to determine the current intent of the user. However, the VPA 110 is able to analyze the dialog context 212 and relate the user's statement at box 1028 to the previous statement made by the system 1000 at box 1022. In other words, the VPA 110 is able to merge (e.g., via the intent mapping 222) the input intent of the statement at box 1028 to the output intent at box 1022. Accordingly, at box 1030, the system 1000 responds indicating the duration of the charge at the previously identified charging station. At box 1032, the user asks what he or she can do to pass the time while his or her vehicle is charging. Again, the VPA 110 is able to leverage the intent information from the dialog context 212 and/or the COI 312 to understand the goal of the user's current statement and provide a suitable response at box 1034.

VPA personalization informed by the intent analyses described herein, and particularly the "offline" analysis performed by the COI analyzer 148, may be particularly beneficial in VPA applications where "search" or frequently asked questions (FAQ's) are the user's main objective (e.g., question and answer environments). In such systems, there is typically no back-end transaction that has occurred. In other words, the user modality is to ask questions, not to perform transactions. As a result, the data exchanged between the user and the VPA 110 is ephemeral. However, with the user's consent, the VPA 110 can retain valuable but ephemeral dialog context information in the chains of intents 312. By analyzing the COI 312, implicit goals or objectives can be revealed, which can be used by the VPA 110 to personalize the user's future dialog experiences with the system. Such applications of the disclosed intent analyses may be particularly appreciated by VPA users where the corpus of information to be searched or from which specific pieces of information need to be extracted is particularly voluminous or complicated, as may be the case in, for example, legal and medical contexts. As an example, a user needing an answer to a specific question about the tax code or the new health care law may appreciate a VPA 110 that can remember factual details from the user's previous conversations with the VPA 110 and apply them to the current dialog session, in order to more quickly and efficiently provide the desired system response.

Implementation Examples

Figure 11:
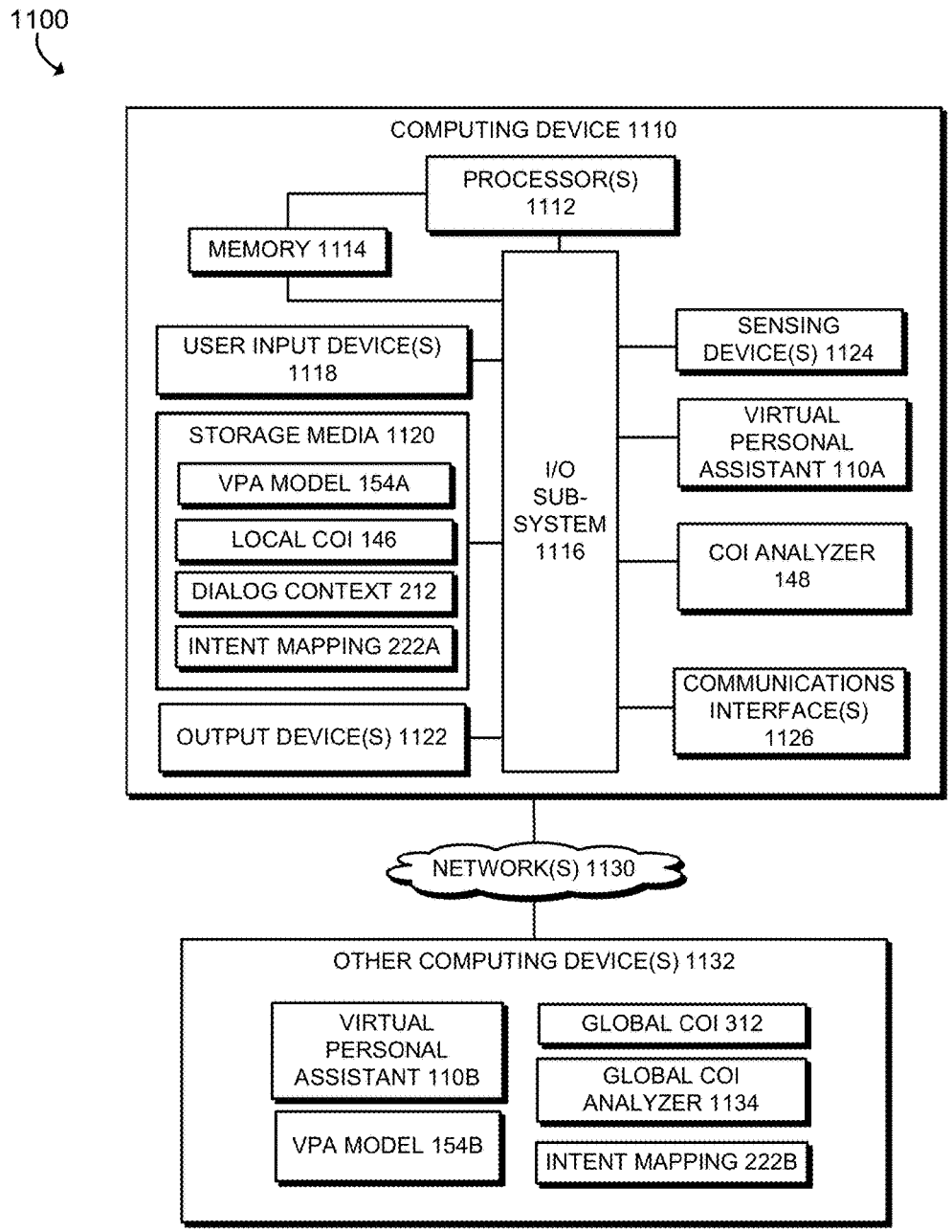
FIG. 11 is a simplified block diagram of at least one embodiment of a hardware environment for the platform of FIG. 1.

Referring now to FIG. 11, a simplified block diagram of an exemplary hardware environment 1100 for the computing system 100, in which the VPA 110 may be embodied, is shown. The illustrative environment 1100 includes a computing device 1110, which may be in communication with one or more other computing devices 1132 via one or more networks 1130. Illustratively, a portion 110A of the VPA 110 is local to the computing device 1110, while another portion 110B is distributed across one or more of the other computing systems or devices 1132 that are connected to the network(s) 1130. Further, illustratively, the COI analyzer 148 is depicted separately from the VPA 110A in the environment of FIG. 11. Accordingly, the COI analyzer 148 may be implemented as a separate component (e.g., a third party application) that interfaces with the VPA 110 and conducts its analysis "offline" as described above, in some embodiments.

In some embodiments, portions of the VPA 110 may be stored locally while other portions thereof are distributed across a network (and likewise for other components of the VPA 110). In some embodiments, however, the VPA 110 may be located entirely on the computing device 1110. In some embodiments, portions of the VPA 110 may be incorporated into other systems or interactive software applications. Such applications or systems may include, for example, operating systems, middleware or framework (e.g., application programming interface or API) software, and/or user-level applications software (e.g., another interactive software application, such as a search engine, web browser or web site application, or a user interface for a computing device).

The illustrative computing device 1110 includes at least one processor 1112 (e.g. a controller, microprocessor, microcontroller, digital signal processor, etc.), memory 1114, and an input/output (I/O) subsystem 1116. The computing device 1110 may be embodied as any type of computing device such as a personal computer or mobile device (e.g., desktop, laptop, tablet, smart phone, body-mounted device, etc.), a server, an enterprise computer system, a network of computers, a combination of computers and other electronic devices, or other electronic devices. Although not specifically shown, it should be understood that the I/O subsystem 1116 typically includes, among other things, an I/O controller, a memory controller, and one or more I/O ports. The processor 1112 and the I/O subsystem 1116 are communicatively coupled to the memory 1114. The memory 1114 may be embodied as any type of suitable computer memory device (e.g., volatile memory such as various forms of random access memory).

The I/O subsystem 1116 is communicatively coupled to a number of components including one or more user input devices 1118 (e.g., a microphone, a touchscreen, keyboard, virtual keypad, etc.), one or more storage media 1120, one or more output devices 1122 (e.g., audio speakers, displays, LEDs, etc.), one or more sensing devices 1124 (e.g., motion sensors, pressure sensors, kinetic sensors, temperature sensors, biometric sensors, and/or others), and one or more communications interfaces 1126, as well as the VPA 110A and the COI analyzer 148. The storage media 1120 may include one or more hard drives or other suitable persistent data storage devices (e.g., flash memory, memory cards, memory sticks, and/or others). Illustratively, the dialog context 212 and portions of the VPA model 154A and the intent mapping 222A reside in the storage media 1120, while other portions of the VPA model 154B and intent mapping 222B reside in storage media of one or more other computing devices 1132. In other embodiments, one or more of these components may reside entirely on the computing device 1110 or on another computing device 1132. Similarly, while the global COI 312 is illustrated as residing on the other computing devices 1132, portions of the global COI 312 (e.g., the local chains of intents 146) may be stored on the computing device 1110.

In the illustrative environment 1100, a global COI analyzer 1134 resides on one or more of the other computing devices 1132. Of course, portions of the global COI analyzer 1134 may reside on the computing device 1110. The global COI analyzer 1134 may be embodied as a version of the COI analyzer 148 that conducts intent analysis across multiple VPA users and/or across multiple VPA applications. As such, the global COI analyzer 1134 may be configured to, for example, "push" inferences 152 out to multiple VPA applications or to multiple users of the same VPA application. Such inferences 152 may therefore be incorporated into NL dialog sessions involving the VPA 110 and one or more other users. Further, the global COI analyzer 1134 may provide analytics to, for example, the vendor utilizing the VPA application to provide products or services to end users.

In some embodiments, portions of systems software (e.g., an operating system, etc.), framework/middleware (e.g., APIs, object libraries, etc.), the VPA 110, and/or the COI analyzer 148 reside at least temporarily in the storage media 1120. Portions of systems software, framework/middleware, the VPA 110 (including the dialog context 212, the intent mapping 222A and the VPA model 154), and/or the COI analyzer 148 may be copied to the memory 1114 during operation of the computing device 1110, for faster processing or other reasons.

The communications interfaces 1126 may communicatively couple the computing device 1110 to one or more local area networks, wide area networks, personal clouds, enterprise clouds, public clouds, and/or to the Internet, for example. Accordingly, the communications interfaces 1126 may include one or more wired or wireless network interface cards or adapters, for example, as may be needed pursuant to the specifications and/or design of the particular computing system 100. Each of the other computing device(s) 1132 may be embodied as any suitable type of computing system or device such as any of the aforementioned types of devices or other electronic devices or systems. For example, in some embodiments, the other computing devices 1132 may include one or more server computers used to store portions of the VPA model 154, the intent mapping 222, or the global COI 312. The computing system 100 may include other components, sub-components, and devices not illustrated in FIG. 11 for clarity of the description. In general, the components of the computing system 100 are communicatively coupled as shown in FIG. 11 by electronic signal paths, which may be embodied as any type of wired or wireless signal paths capable of facilitating communication between the respective devices and components.

Additional Examples

According to at least one aspect of this disclosure, a method for personalizing a user experience with a computerized virtual personal assistant ("VPA") application includes, where the VPA application enables user-directed natural language dialog between a user and the VPA application, maintaining a chain of intents, where the chain of intents includes a plurality of temporally-spaced intents, and each of the intents represents a structured interpretation of natural language dialog expressed by a user of the VPA application during a conversational natural language dialog session involving the user and the VPA application. The method also includes recognizing a pattern of intents in the chain of intents, deriving an inference from the pattern of intents, where the inference includes a conclusion about the user or about the dialog session between the user and the VPA application that is not otherwise available to the VPA application. The method also includes applying the inference to a subsequent conversational natural language dialog session involving the VPA application and the user.

The method may include determining a goal likely intended to be accomplished by the user during the dialog session, inferring from the pattern of intents that the goal has been fulfilled, and incorporating the inference that the goal has been fulfilled into output generated by the VPA application during the subsequent dialog session.

The method may include determining a goal likely intended to be accomplished by the user during the dialog session, inferring from the pattern of intents that the goal has not been fulfilled, and incorporating the inference that the goal has not been fulfilled into output generated by the VPA application during the subsequent dialog session. The method may include, during the subsequent dialog session, presenting natural language output relating to the goal. The method may include inferring from the pattern of intents a preference, opinion, or characteristic of the user, and adapting output generated by the VPA application during the subsequent dialog session to incorporate the user's preference, opinion, or characteristic. The method may include adjusting an interpretation of natural language dialog expressed by the user during the subsequent dialog session based on the inference derived from the pattern of intents.

In the method, each of the intents in the chain of intents may include an input intent, and the method may include associating one or more output intents with each of the input intents, where each of the output intents relates to output generated by the VPA application in response to one of the input intents. In the method, the chain of intents may include a number of temporally-spaced input intents and output intents, and each of the output intents may relate to output generated by the VPA application in response to one of the input intents. In the method, the chain of intents may include intents that represent interpretations of natural language dialog expressed by a user of the VPA application during a plurality of different conversational natural language dialog sessions involving the user and the VPA application, and the method may include recognizing the pattern of intents across the plurality of different dialog sessions. The method may be embodied as computer-executable instructions stored in one or more machine accessible storage media. The method may include any one or more of the foregoing features, or any combination thereof.

According to at least one aspect of this disclosure, a virtual personal assistant ("VPA") computer application is embodied in one or more machine-accessible storage media, and the VPA computer application includes a user interface through which a user-directed conversational natural language dialog session may be conducted between a computing device and a user; and a VPA engine to conduct the dialog session and initiate the providing of a service or information to the user in response to conversational natural language dialog supplied by the user during the dialog session, where the VPA engine is configured to maintain a dialog context, where the dialog context includes a plurality of temporally-spaced intents, and each of the intents represents at least a partial interpretation of natural language dialog expressed by the user during the dialog session. The VPA engine is also configured to determine a current intent, where the current intent represents a partial interpretation of natural language dialog expressed by the user subsequent to the natural language dialog represented by the intents in the dialog context, identify an intent in the dialog context having a data relationship with the current intent, combine the identified intent with the current intent in accordance with the data relationship, and generate system output based on the combined intent.

The VPA computer application may be configured to determine an intent mapping, where the intent mapping defines the data relationship between the current intent and the identified intent, and the VPA engine is configured to combine the identified intent with the current intent in accordance with the intent mapping. The VPA engine may be configured to determine a relationship between a parameter of the current intent and a parameter of the identified intent based on the intent mapping, and add a data value associated with the parameter of the identified intent with the current intent. The intent mapping may identify a field of the current intent as similar to a field of the identified intent. The current intent may represent a partial interpretation of natural language dialog expressed by the user subsequent to an intervening instance of user-supplied conversational natural language dialog, and the intervening instance may be temporally subsequent to the natural language dialog represented by the identified intent.

In the VPA computer application, each intent in the dialog context may have a status, and the VPA engine may be configured to select the identified intent based on the status of the identified intent. The VPA engine may be configured to search the dialog context for intents that have a specified status, parameter, or data value, and select the identified intent from a set of intents that have the specified status, parameter, or data value. The VPA engine may be configured to select the identified intent based on an inference, and the inference may be derived from a pattern of intents associated with a plurality of different conversational natural language dialog sessions involving the user and the VPA computer application. In the VPA computer application, each of the intents including the combined intent may have a status of complete or incomplete, and if the status of the combined intent is complete, the VPA engine may be configured to determine whether another intent in the dialog context has a status of incomplete, and if another intent in the dialog context has a status of incomplete, the VPA engine may be configured to add the combined intent to the dialog context and use the dialog context to interpret the other incomplete intent. According to at least one aspect of this disclosure, a computing device includes machine accessible storage media and a processor, where at least a portion of any of the foregoing VPA computer applications may be stored in the machine accessible storage media and the VPA computer application may be executable by the processor.

According to at least one aspect of this disclosure, an intent analyzer to analyze a user experience with a computerized virtual personal assistant ("VPA") application, where the VPA application enables user-directed natural language dialog between a user and the VPA application, is embodied in one or more machine accessible storage media and configured to maintain a set of intents, where one or more of the intents represents a structured interpretation of natural language dialog expressed by a user of the VPA application during a conversational natural language dialog session involving the user and the VPA application; identify a pattern of intents in the set of intents; derive an inference about the dialog session from the pattern of intents; and apply the inference to another conversational natural language dialog session involving the VPA application. The set of intents may include an intent representing an interpretation of natural language dialog expressed by another user of the VPA application. The intent analyzer may be configured to incorporate the inference into one or more other conversational natural language dialog sessions involving the VPA application and one or more other users. The intent analyzer may include deriving the inference from an interpretation of non-dialog input received by the computer system. The intent analyzer may be embodied as machine readable instructions executable by a computing device. The intent analyzer may be embodied as one or more modules of the VPA application.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into submodules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A computer-implemented method comprising:
receiving, by a computing device, verbal input, wherein the verbal input includes natural language;
determining an input intent associated with the verbal input, wherein the input intent is associated with an action that can be performed by the computing device, wherein the intent is determined using a dialog context, and wherein the dialog context includes a history of a current dialog session;
adding the input intent to a history of intents, wherein the history of intents includes one or more intents from one or more previous dialog sessions, wherein the one or more intents include a transient intent, and wherein a transient intent does not cause the computing device to perform an action;
determining an unstated characteristic associated with the history of intents, wherein determining includes identifying a pattern associated with the one or more intents from the history of intents and associating the pattern with the transient intent;
modifying the action associated with the input intent, wherein the action is modified using the unstated characteristic; and
executing the modified action, wherein the modified action modifies an operation of the computing device, and wherein executing the modified action fulfills the associated input intent.

2. The computer-implemented method of claim 1, wherein identifying the pattern associated with the one or more intents includes determining, among the one or more intents, one or more occurrences of the input intent.

3. The computer-implemented method of claim 1, wherein identifying the pattern associated with the one or more intents includes determining, among the one or more intents, a combination of intents.

4. The computer-implemented method of claim 1, further comprising:
determining an unstated objective, wherein the unstated objective is determined using the unstated characteristic and the input intent, wherein modifying the action includes modifying the action to include the unstated objected, and where executing the modified action fulfills the unstated objective.

5. The computer-implemented method of claim 1, further comprising:
determining an objective associated with the current dialog session; and
using the unstated characteristic to determine whether the objective associated with the current dialog session has been fulfilled.

6. The computer-implemented method of claim 5, wherein the action is modified using a result of determining whether objective associated with the current dialog session has been fulfilled.

7. The computer-implemented method of claim 1, wherein the unstated characteristic is associated with a preference.

8. The computer-implemented method of claim 1, further comprising:
receiving additional verbal input; and
determining a second input intent, wherein the second input intent is associated with the additional verbal input, and wherein determining includes using the unstated characteristic.

9. The computer-implemented method of claim 1, wherein the one or more intents from the history of intents include an intent determined using non-verbal input.

10. The computer-implemented method of claim 1, wherein the verbal input and the current dialog session are associated with a first user, and wherein the history of intents includes a dialog session associated with a second user.

11. The computer-implemented method of claim 1, wherein the verbal input and the current dialog session are associated with a first user, and wherein the unstated characteristic is associated with a second user.

12. A computing device, comprising:
one or more processors; and
a non-transitory computer-readable medium including instructions that, when executed by the one or more processors, cause the one or more processors to perform operations including:
receiving verbal input, wherein the verbal input includes natural language;
determining an input intent associated with the verbal input, wherein the input intent is associated with an action that can be performed by the computing device, wherein the intent is determined using a dialog context, and wherein the dialog context includes a history of a current dialog session;
adding the input intent to a history of intents, wherein the history of intents includes one or more intents from one or more previous dialog sessions, wherein the one or more intents include a transient intent, and wherein a transient intent does not cause the computing device to perform an action;
determining an unstated characteristic associated with the history of intents, wherein determining includes identifying a pattern associated with the one or more intents from the history of intents and associating the pattern with the transient intent;
modifying the action associated with the input intent, wherein the action is modified using the unstated characteristic; and
executing the modified action, wherein the modified action modifies an operation of the computing device, and wherein executing the modified action fulfills the associated input intent.

13. The computing device of claim 12, wherein the instructions for identifying the pattern associated with the one or more intents include instructions that, when executed by the one or more processors, cause the one or more processors to perform operations including:
  determining, among the one or more intents, one or more occurrences of the input intent.

14. The computing device of claim 12, wherein the instructions for identifying the pattern associated with the one or more intents include instructions that, when executed by the one or more processors, cause the one or more processors to perform operations including:
  determining, among the one or more intents, a combination of intents.

15. The computing device of claim 12, wherein the non-transitory computer-readable medium further includes instructions that, when executed by the one or more processors, cause the one or more processors to perform operations including:
  determining an unstated objective, wherein the unstated objective is determined using the unstated characteristic and the input intent, wherein modifying the action includes modifying the action to include the unstated objected, and where executing the modified action fulfills the unstated objective.

16. The computing device of claim 12, wherein the non-transitory computer-readable medium further includes instructions that, when executed by the one or more processors, cause the one or more processors to perform operations including:
  determining an objective associated with the current dialog session; and
  using the unstated characteristic to determine whether the objective associated with the current dialog session has been fulfilled.

17. The computing device of claim 16, wherein the action is modified using a result of determining whether objective associated with the current dialog session has been fulfilled.

18. The computing device of claim 12, wherein the unstated characteristic is associated with a preference.

19. The computing device of claim 12, wherein the non-transitory computer-readable medium further includes instructions that, when executed by the one or more processors, cause the one or more processors to perform operations including:
  receiving additional verbal input; and
  determining a second input intent, wherein the second input intent is associated with the additional verbal input, and wherein determining includes using the unstated characteristic.

20. The computing device of claim 12, wherein the one or more intents from the history of intents include an intent determined using non-verbal input.

21. The computing device of claim 12, wherein the verbal input and the current dialog session are associated with a first user, and wherein the history of intents includes a dialog session associated with a second user.

22. The computing device of claim 12, wherein the verbal input and the current dialog session are associated with a first user, and wherein the unstated characteristic is associated with a second user.

23. A computer-program product tangibly embodied in a non-transitory machine-readable storage medium, including instructions that, when executed by one or more processors, cause the one or more processors to:
  receive, by a computing device, verbal input, wherein the verbal input includes natural language;
  determine an input intent associated with the verbal input, wherein the input intent is associated with an action that can be performed by the computing device, wherein the intent is determined using a dialog context, and wherein the dialog context includes a history of a current dialog session;
  add the input intent to a history of intents, wherein the history of intents includes one or more intents from one or more previous dialog sessions, wherein the one or more intents include a transient intent, and wherein a transient intent does not cause the computing device to perform an action;
  determine an unstated characteristic associated with the history of intents, wherein determining includes identifying a pattern associated with the one or more intents from the history of intents and associating the pattern with the transient intent;
  modify the action associated with the input intent, wherein the action is modified using the unstated characteristic; and
  execute the modified action, wherein the modified action modifies an operation of the computing device, and wherein executing the modified action fulfills the associated input intent.

24. The computer-program product of claim 23, wherein the instructions for identifying the pattern associated with the one or more intents include instructions that, when executed by the one or more processors, cause the one or more processors to perform operations including:
  determining, among the one or more intents, one or more occurrences of the input intent.

25. The computer-program product of claim 23, wherein the instructions for identifying the pattern associated with the one or more intents include instructions that, when executed by the one or more processors, cause the one or more processors to perform operations including:
  determining, among the one or more intents, a combination of intents.

26. The computer-program product of claim 23, wherein the non-transitory computer-readable medium further includes instructions that, when executed by the one or more processors, cause the one or more processors to perform operations including:
  determining an unstated objective, wherein the unstated objective is determined using the unstated characteristic and the input intent, wherein modifying the action includes modifying the action to include the unstated objected, and where executing the modified action fulfills the unstated objective.

27. The computer-program product of claim 23, wherein the non-transitory computer-readable medium further includes instructions that, when executed by the one or more processors, cause the one or more processors to perform operations including:
  determining an objective associated with the current dialog session; and
  using the unstated characteristic to determine whether the objective associated with the current dialog session has been fulfilled.

28. The computer-program product of claim 27, wherein the action is modified using a result of determining whether objective associated with the current dialog session has been fulfilled.

29. The computer-program product of claim 23, wherein the unstated characteristic is associated with a preference.

30. The computer-program product of claim 23, wherein the non-transitory computer-readable medium further includes instructions that, when executed by the one or more processors, cause the one or more processors to perform operations including:

receiving additional verbal input; and determining a second input intent, wherein the second input intent is associated with the additional verbal input, and wherein determining includes using the unstated characteristic.

31. The computer-program product of claim 23, wherein the one or more intents from the history of intents include an intent determined using non-verbal input.

32. The computer-program product of claim 23, wherein the verbal input and the current dialog session are associated with a first user, and wherein the history of intents includes a dialog session associated with a second user.

33. The computer-program product of claim 23, wherein the verbal input and the current dialog session are associated with a first user, and wherein the unstated characteristic is associated with a second user.

\* \* \* \* \*